US008674937B2

(12) United States Patent  (10) Patent No.: US 8,674,937 B2
Aonuma et al.  (45) Date of Patent: *Mar. 18, 2014

(54) STORAGE MEDIUM HAVING STORED THEREON PROGRAM FOR ADJUSTING POINTING DEVICE, AND POINTING DEVICE

(75) Inventors: Eiji Aonuma, Kyoto (JP); Kenji Matsutani, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 192 days.

This patent is subject to a terminal disclaimer.

(21) Appl. No.: 13/105,421

(22) Filed: May 11, 2011

(65) Prior Publication Data

US 2011/0210916 A1  Sep. 1, 2011

Related U.S. Application Data

(63) Continuation of application No. 11/727,077, filed on Mar. 23, 2007, now Pat. No. 7,969,413.

(30) Foreign Application Priority Data

Nov. 17, 2006 (JP) ................................ 2006-312145

(51) Int. Cl.
 *G06F 3/033* (2013.01)
 *G06F 3/0346* (2013.01)
(52) U.S. Cl.
 USPC ............... 345/156; 345/157; 463/49; 463/52
(58) Field of Classification Search
 USPC ...................................... 345/157; 463/43–53
 See application file for complete search history.

(56) References Cited

U.S. PATENT DOCUMENTS

| 6,184,863 | B1 * | 2/2001 | Sibert et al. .................. 345/156 |
| 6,727,885 | B1 | 4/2004 | Ishino et al. |
| 7,161,596 | B2 | 1/2007 | Hoile |
| 7,627,139 | B2 * | 12/2009 | Marks et al. .................. 382/103 |
| 2002/0085097 | A1 * | 7/2002 | Colmenarez et al. ......... 348/211 |
| 2004/0193413 | A1 * | 9/2004 | Wilson et al. ................. 704/243 |
| 2006/0060384 | A1 * | 3/2006 | Michael .......................... 175/53 |
| 2006/0239471 | A1 | 10/2006 | Mao et al. |
| 2007/0060384 | A1 * | 3/2007 | Dohta ............................ 463/43 |
| 2008/0056561 | A1 * | 3/2008 | Sawachi ........................ 382/154 |
| 2009/0054162 | A1 * | 2/2009 | Utsuki et al. .................. 463/53 |

FOREIGN PATENT DOCUMENTS

JP  08-038741  2/1996

* cited by examiner

*Primary Examiner* — Joe H Cheng
*Assistant Examiner* — Benyam Ketema
(74) *Attorney, Agent, or Firm* — Nixon & Vanderhye P.C.

(57) ABSTRACT

A pointing device includes a controller for pointing a position on a display surface by imaging an imaging objective such as two markers positioned with a predetermined interval therebetween in a vicinity of the display surface of a monitor. With the pointing device, a width of the display surface and the interval between the markers are obtained to determine an appropriate distance between the controller and the monitor. Further, a current distance between the controller and the monitor (markers) is calculated. Relation between the current distance and the appropriate distance is notified by such as image display or sound output. For example, an image indicating the appropriate distance and an adjustment image varying in size in conjunction with the current distance are displayed on the monitor.

11 Claims, 17 Drawing Sheets

(A)

(B)

DISPLAY WIDTH D = S × M/W (A) IDEAL POINTING TO LEFT END OF DISPLAY SCREEN $\theta = \arctan(D/2L)$ (B) LIMIT OF RECOGNITION WHEN CONTROLLER IS WAVED TO LEFT $\beta = \alpha/2 - \arctan(S/2L)$ (A) WHEN CURRENT DISTANCE IS LONGER THAN APPROPRIATE DISTANCE (B) WHEN CURRENT DISTANCE IS SHORTER THAN APPROPRIATE DISTANCE

REFERENCE IMAGE INDICATING APPROPRIATE DISTANCE

ADJUSTMENT IMAGE INDICATING CURRENT DISTANCE

FIG. 13

APPROPRIATE DISTANCE TABLE

| DISPLAY WIDTH | APPROPRIATE DISTANCE |
|---|---|
| D1 | L1 |
| D2 | L2 |
| D3 | L3 |
| ⋮ | ⋮ |
| Dn | Ln |

DISPLAY SIZE INPUT SCREEN

APPROPRIATE DISTANCE TABLE

| DISPLAY SIZE | DISPLAY WIDTH | APPROPRIATE DISTANCE |
|---|---|---|
| K1 | D1 | L1 |
| K2 | D2 | L2 |
| K3 | D3 | L3 |
| ⋮ | ⋮ | ⋮ |
| Kn | Dn | Ln |

STORAGE MEDIUM HAVING STORED THEREON PROGRAM FOR ADJUSTING POINTING DEVICE, AND POINTING DEVICE

CROSS REFERENCE OF RELATED APPLICATIONS

The disclosure of Japanese Patent Application No. 2006-312145 is incorporated herein by reference. This application is a continuation of U.S. application Ser. No. 11/727,077 filed Mar. 23, 2007, the entire content of which is incorporated by reference.

BACKGROUND

1. Field

Present example embodiments of the invention relate to a storage medium having stored thereon a program for adjusting a pointing device, as well as to a pointing device. In particular, the present invention relates to, for example, a storage medium having stored thereon a program for adjusting a pointing device, the program conducting information processing using input data obtained from an input apparatus provided with an imaging means for imaging a known imaging objective to output to a display apparatus, as well as to a pointing device.

2. Description of the Related Art

An example of this type of pointing device conventionally employed is disclosed in the document 1 (Japanese Patent Laying-Open No. 08-38741). According to a shooting game apparatus of the document 1, light alternately emitted from a pair of light emitting elements is sequentially and alternately received with a light receiving element provided at a muzzle. The light receiving element outputs a plurality of detection signals such as a distance from a display screen and an incident angle of the light from each light emitting element. Based on the plurality of detection signals, a first calculation circuit calculates aiming coordinates. On the other hand, a second calculation circuit constantly recognizes coordinates of a target image in the display screen, and determines whether or not the coordinates of the target image substantially matches the aiming coordinates upon operation of a switch.

The technique disclosed in the document 1 is commonly seen in arcade game machines. In a case of a typical arcade game machine, positions of the display apparatus and the light emitting elements may be fixed previously in a designing phase. Further, because a gun (gun controller) for games provided with the light receiving elements is also connected via a cable to the arcade game machine, a range of movement of the gun controller is previously limited. Consequently, by previously setting so that coordinates at a right end of the display apparatus becomes the aiming coordinates when the right end of the display apparatus is aimed with the gun controller while coordinates at a left end of the display apparatus becomes the aiming coordinates when the left end of the display apparatus is aimed with the gun controller, it is possible to play a game using any arcade game machine comfortably to some extent.

However, an attempt of realizing the pointing device as described above in a home-use game machine encounters a problem of varying use environment, i.e. a size of a television screen, a distance between a display and the gun controller, and an interval between positions of the light emitting elements are different for each family. Therefore, determining the correspondence based on a fixed configuration may be appropriate in some cases but inappropriate in different cases.

The latter case may cause a problem such that the gun controller points a direction (position on the display screen) largely deviated from a direction instructed by a player.

SUMMARY OF THE INVENTION

In view of the above problems, a major object of the present invention is to provide a novel storage medium having stored thereon a program for adjusting a pointing device, as well as a pointing device.

Further, another object of the present invention is to provide a storage medium having stored thereon a program for adjusting a pointing device, the program being capable of setting a configuration best suited for a use environment, as well as a pointing device.

Example embodiments of the present invention adopt the following features. It should be noted that the reference numerals inside the parentheses, supplement, etc. only show one example of a correspondence with the embodiment to be described later in order to aid the understanding of the present invention, and do not limit the present invention.

A first invention provides a storage medium having stored thereon a program for adjusting executed in a computer of a pointing device for obtaining input data from an input apparatus provided with an imaging means for imaging a known imaging objective, the input data being one of data of an imaged image obtained by the imaging means and data obtained by performing a predetermined operation on the obtained data of the imaged image, and performing information processing using the input data to output to a display apparatus. The program for adjusting has the computer execute: a display surface width obtaining step, an appropriate distance determining step, a current distance calculating step, and a notifying step. In the display surface width obtaining step, a maximum width of a display surface of the display apparatus is obtained. In the appropriate distance determining step, an appropriate distance between the input apparatus and the display apparatus is determined according to the maximum width of the display surface obtained in the display surface width obtaining step. In the current distance calculating step, a current distance from the input apparatus to the imaging objective is calculated based on the input data. In the notifying step, a notification is made according to relation between the appropriate distance and the current distance.

In the first invention, the program for adjusting is executed by a computer (36) of a pointing device (12). With this pointing device, it is possible to obtain an input by imaging a known imaging objective (340m and 340n) with an imaging means (98) of an input apparatus (22). The size, for example, of the imaging objective is previously determined, that is, made known. Further, in one embodiment, the distance between two markers as the imaging objective is made known. In the pointing device, the input data as one of the data of the imaged image obtained by the imaging means and the data obtained by performing the predetermined operation on the obtained data of the imaged image is obtained, and the information processing is performed using the input data to output the resulting data to the display apparatus (34). The program for adjusting has the computer of such a pointing device execute a process of adjusting the distance between the input apparatus and the imaging objective or display apparatus to an appropriate distance. Specifically, in the display surface width obtaining step (S3, S3', and S105), the maximum width of the display surface (display width D) of the display apparatus is obtained. The maximum width of the display surface may be obtained either by, for example, a direct input by the user, or an input of the size of the display apparatus by the user. Alternatively, the maximum width of the display surface may be calculated by obtaining a real distance and a distance on the image between the two markers as the imaging objective. In the appropriate distance determining step (S5), the appropriate distance between the input apparatus and the imaging objective or display apparatus is determined according to the maximum width of the display surface. As described later, by calculating a distance L according to relation when an angle θ (expressed by an equation 2) obtained from positional relation when ideally pointing an end of the display screen becomes equal to an angle β (expressed by an equation 3) obtained from positional relation to be a limit of recognition of the imaging objective, it is possible to obtain the appropriate distance. For example, by previously storing a table showing the appropriate distance associated with the maximum width of the display surface of a conventional display apparatus, and by referring to this table, the appropriate distance may be obtained. Alternatively, the appropriate distance may be calculated according to the above relation for calculating the appropriate distance. In the current distance calculating step (S11), the current distance (Lc) between the input apparatus and the imaging objective is calculated based on the input data. In an embodiment described later, because the imaging objective are known and the width of the imaged image and the viewing angle of the imaging means are determined, the current distance is calculated according to equations 4 and 5 using the distance of the imaging objective in imaged image. In a notifying step (S13), the notification according to the relation between the appropriate distance and the current distance is made. The notification with which whether or not the current distance is the appropriate distance may be recognized is made by a method such as image display, sound output, vibration, or light output.

According to the first invention, it is possible to determine the appropriate distance according to the maximum width of the display surface of the display apparatus, and to make the notification according to the appropriate distance and the current distance. Therefore, it is possible to notify the user whether or not the current distance is the appropriate distance.

A second invention provides a storage medium having stored thereon a program for adjusting a pointing device according to the first invention. In the notifying step, the notification is made by one of outputting image display, outputting sound such as a voice sound and a sound effect, and having the input apparatus vibrate, according to a difference between the current distance and the appropriate distance.

In the second invention, the image according to the difference between the current distance and the appropriate distance is displayed on the display apparatus, or the sound such as the voice sound or the sound effect according to the above difference is outputted from sound outputting devices (34a and 104), or a vibration device (106) of the input apparatus is vibrated according to the above difference. Therefore, it is readily possible to notify the difference between the current distance and the appropriate distance, thereby facilitating the adjustment to the appropriate distance.

A third invention provides a storage medium having stored thereon a program for adjusting a pointing device according to the first invention. In the notifying step, the notification is made by displaying, on the display apparatus, a reference image having a predetermined size and an adjustment image varying in size in conjunction with the current distance and becoming the same size as the reference image when the current distance is equal to the appropriate distance.

In the third invention, a reference image (202) of the predetermined size and an adjustment image (204) varying in size in conjunction with the current distance are displayed. When the current distance becomes the appropriate distance, the size of the adjustment image becomes the same as that of the reference image. It is possible to facilitate the adjustment to the appropriate distance by changing the distance from the imaging objective to the input apparatus so as to match the size of the adjustment image with the size of the reference image.

A fourth invention provides a storage medium having stored thereon a program for adjusting a pointing device according to the first invention. In the known imaging objective is constituted by two markers positioned with a predetermined distance therebetween measured in a first scale, the two markers being positioned in a vicinity of a predetermined side of the display surface of the display apparatus so that a positioning direction of the two markers is in parallel to the predetermined side. The program for adjusting further has the computer execute a distance obtaining step of obtaining the predetermined distance either inputted by a user or previously stored. The display surface width obtaining step includes: a marker distance measuring step of measuring a distance between the two markers in a second scale by varying an interval in the positioning direction between the two markers in an image displayed on the display surface, according to the input by the user; and a display surface width calculating step of calculating the maximum width of the display surface in the first scale based on a ratio between the predetermined distance obtained in the distance obtaining step and the distance between the markers measured in the marker distance measuring step, as well as based on the maximum width of the display surface in the second scale.

In the fourth invention, the two markers as the imaging objective are positioned in a vicinity of the predetermined side of the display surface of the display apparatus so that the two markers is in parallel to the predetermined side. The two markers are positioned with the predetermined distance therebetween measured in the first scale. In the distance obtaining step (S1), the predetermined distance between the two markers (sensor width S) is obtained. Specifically, the predetermined distance between the two markers is obtained in the first scale. The first scale is, for example, meters as a unit for measuring a real distance. The predetermined distance between the two markers is inputted by the user. Alternatively, when the distance between the two markers is fixed, the previously stored predetermined distance between the two markers is obtained. In the marker distance measuring step (S41), the distance between the two markers (sensor-corresponding width W) in the display surface is measured in the second scale, using an image (200) in which the interval in the positioning direction between the two markers varies according to the user input. The second scale is, for example, is a unit for a digital image (pixel), and it is possible to measure the distance on the image. In the display surface width calculation step (S37), the maximum width of the display surface (display width D) in the first scale is calculated based on a ratio of the predetermined distance (the sensor width S) in the first scale and the distance (sensor-corresponding width W) in the second scale, as well as based on the maximum width of the display surface (the maximum display width M) in the second scale, according to an equation 1 described later, for example. As described above, because the maximum width of the display surface in the second scale is previously determined and stored, it is possible to calculate the maximum width of the display surface, by obtaining the predetermined distance between the two markers in the first scale, and measuring the interval between positions of the two makers in the second scale. Therefore, the adjustment can be readily performed even if the user does not know the maximum width of the display surface of the display apparatus.

A fifth invention provides a storage medium having stored thereon a program for adjusting a pointing device according to the first invention. The known imaging objective is constituted by two markers positioned with a predetermined distance therebetween measured in a first scale, the two markers being positioned in a vicinity of a predetermined side of the display surface of the display apparatus so that a positioning direction of the two markers is in parallel to the predetermined side. The program for adjusting further has the computer execute a distance obtaining step of obtaining the predetermined distance either inputted by a user or previously stored. The display surface width obtaining step includes: a marker distance measuring step of measuring a distance between the two markers in a second scale by varying an interval in the positioning direction between the two markers in an image displayed on the display surface, according to the input by the user; and a display surface width calculating step of calculating the maximum width of the display surface in the first scale based on a ratio between the distance between the markers measured in the marker distance measuring step and the maximum width of the display surface in the second scale, as well as based on the predetermined distance obtained in the distance obtaining step.

The fifth invention is the same as the above described fourth invention other than the calculation in the display surface width calculation step. In the display surface width calculation step, the maximum width of the display surface (display width D) in the first scale is calculated based on the ratio of the distance between the two markers (sensor-corresponding width W) in the second scale and the maximum width of the display surface (the maximum display width M) in the second scale, and based on the predetermined distance between the two markers (the sensor width S) in the first scale. Therefore, the adjustment can be readily performed even if the user does not know the maximum width of the display surface of the display apparatus.

A sixth invention provides a storage medium having stored thereon a program for adjusting a pointing device according to the fourth invention. In the current distance calculating step, the current distance is calculated using the distance between the two markers on the imaged image obtained by the imaging means.

According to the sixth invention, in the current distance calculating step, the current distance (Lc) is calculated using the distance between the two markers (Si) on the imaged image. Therefore, the user may easily adjust by changing the distance from the display apparatus or the imaging objective while holding the input apparatus and imaging the imaging objective.

A seventh invention provides a storage medium having stored thereon a program for adjusting a pointing device according to the fifth invention. In the current distance calculating step, the current distance is calculated using the distance between the two markers on the imaged image obtained by the imaging means. The effect of the seventh invention is the same as that of the sixth invention.

A eighth invention provides a storage medium having stored thereon a program for adjusting a pointing device according to the first invention. The display surface width obtaining step includes a display surface width inputting step of obtaining the maximum width, inputted by the user, of the display surface of the display apparatus.

According to the eighth invention, in the display surface width inputting step (S3' and S105), the maximum width of the display surface (display width D) is obtained, for example, based on the data from the input apparatus according to an operation, by the user, of an operation means (72) provided for the input apparatus. Therefore, it is possible for the user to input the display width if the user knows the maximum width of the display surface of the display apparatus.

A ninth invention provides a pointing device for obtaining input data from an input apparatus provided with an imaging means for imaging a known imaging objective, the input data being one of data of an imaged image obtained by the imaging means and data obtained by performing a predetermined operation on the obtained data of the imaged image, and performing information processing using the input data to output to a display apparatus. The pointing device includes: a display surface width obtaining means, an appropriate distance determining means, a current distance calculating means, and a notifying means. The display surface width obtaining means obtains a maximum width of a display surface of the display apparatus. The appropriate distance determining means determines an appropriate distance between the input apparatus and the display apparatus according to the maximum width of the display surface obtained by the display surface width obtaining means. The current distance calculating means calculates a current distance from the input apparatus to the imaging objective based on the input data. The notifying means makes a notification according to relation between the appropriate distance and the current distance.

A tenth invention provides a pointing device according to the ninth invention. The notifying means makes the notification by one of outputting image display, outputting sound such as a voice sound and a sound effect, and having the input apparatus vibrate, according to a difference between the current distance and the appropriate distance.

An eleventh invention provides a pointing device according to the ninth invention. The notifying means makes the notification by displaying, on the display apparatus, a reference image having a predetermined size and an adjustment image varying in size in conjunction with the current distance and becoming the same size as the reference image when the current distance is equal to the appropriate distance.

A twelfth invention provides a pointing device according to the ninth invention. The known imaging objective is constituted by two markers positioned with a predetermined distance therebetween measured in a first scale, the two markers being positioned in a vicinity of a predetermined side of the display surface of the display apparatus so that a positioning direction of the two markers is in parallel to the predetermined side. The pointing device further comprises a distance obtaining means for obtaining the predetermined distance either inputted by a user or previously stored. The display surface width obtaining means includes: a marker distance measuring means for measuring a distance between the two markers in a second scale by varying an interval in the positioning direction between the two markers in an image displayed on the display surface, according to the input by the user; and a display surface width calculating means for calculating the maximum width of the display surface in the first scale based on a ratio between the predetermined distance obtained by the distance obtaining means and the distance between the markers measured by the marker distance measuring means, as well as based on the maximum width of the display surface in the second scale.

A thirteenth invention provides a pointing device according to the ninth invention. The known imaging objective is constituted by two markers positioned with a predetermined distance therebetween measured in a first scale, the two markers being positioned in a vicinity of a predetermined side of the display surface of the display apparatus so that a positioning direction of the two markers is in parallel to the predetermined side. The pointing device further comprises a distance obtaining means for obtaining the predetermined distance either inputted by a user or previously stored. The display surface width obtaining means includes: a marker distance measuring means for measuring a distance between the two markers in a second scale by varying an interval in the positioning direction between the two markers in an image displayed on the display surface, according to the input by the user; and a display surface width calculating means for calculating the maximum width of the display surface in the first scale based on a ratio between the distance between the markers measured by the marker distance measuring means and the maximum width of the display surface in the second scale, as well as based on the predetermined distance obtained by the distance obtaining means.

A fourteenth invention provides a pointing device according to the twelfth invention. The current distance calculating means calculates the current distance using the distance between the two markers on the imaged image obtained by the imaging means.

A fifteenth invention provides a pointing device according to the thirteenth invention. The current distance calculating means calculates the current distance using the distance between the two markers on the imaged image obtained by the imaging means.

A sixteenth invention provides a pointing device according to the ninth invention. The display surface width obtaining means includes a display surface width inputting means for obtaining the maximum width, inputted by the user, of the display surface of the display apparatus.

The ninth to sixteenth inventions relate to pointing devices corresponding to the above described storage medium of the first to eighth inventions, and have the similar effects therewith.

According to example embodiments of the present invention, the relation between the current distance between the imaging objective and the input apparatus and the appropriate distance may be notified, and therefore, it is possible to set the most appropriate setting for the use environment. The user may operate with an appropriate distance in which the position or the direction pointed by the user matches the position or the direction recognized on the display screen.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3(A) is an oblique perspective view from rear top, and FIG. 3(B) is an oblique perspective view from front bottom;

FIG. 9(A) shows the positional relation when a left end of the display screen is ideally pointed, and FIG. 9(B) shows the positional relation for limit of recognition when waving the controller to the left;

FIG. 11(A) shows a case where the current distance is longer than the appropriate distance, and FIG. 11(B) shows a case where the current distance is shorter than the appropriate distance;

FIG. 13 is an illustrative view showing table data of the appropriate distance;

DETAILED DESCRIPTION OF THE PREFERRED EMBODIMENTS

Figure 1:
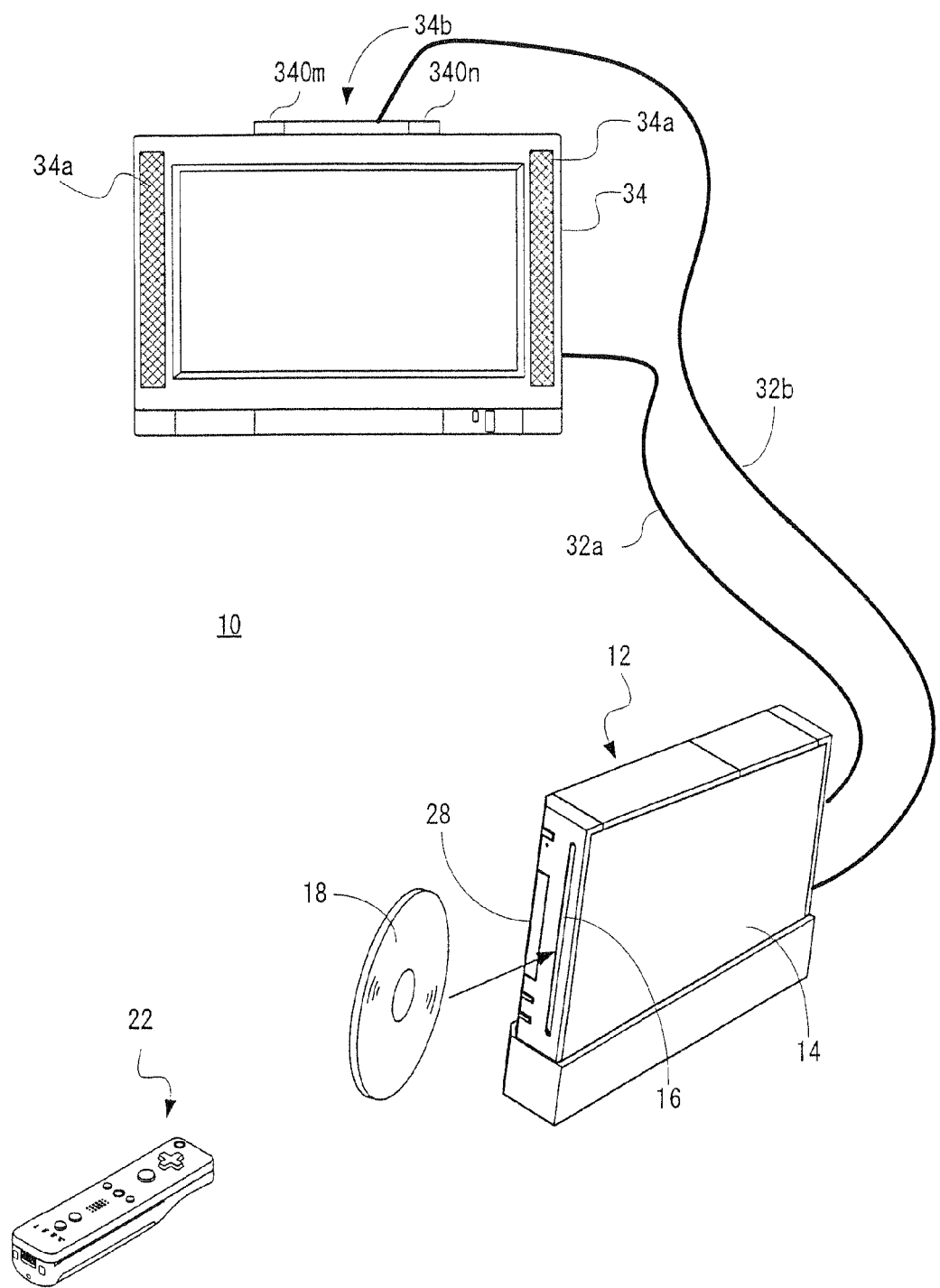
FIG. 1 is an illustrative view showing an appearance of a gaming system according to one embodiment of the present invention.

Referring to FIG. 1, a pointing device is formed with a configuration of a game system of one embodiment of the present invention. The game system 10 includes a video game apparatus 12 and a controller 22. The video game apparatus 12 and the controllers 22 are connected by radio. For example, wireless communication is executed according to Bluetooth (registered trademark) standard, and may be executed by other standards, such as infrared rays and wireless LAN.

The video game apparatus 12 includes a roughly rectangular parallelepiped housing 14, and the housing 14 is provided with a disk slot 16 on a front surface. An optical disk 18 (see FIG. 2) as one example of an information storage medium storing game program and data is inserted into the disk slot 16 to be loaded in a disk drive 68 (see FIG. 2) within the housing 14.

On the front surface of the housing 14 of the video game apparatus 12 and near the disk slot 16 is provided a memory card slot cover 28. Inside the memory card slot cover 28, a memory card slot (not illustrated) is provided into which an external memory card (hereinafter, simply referred to as "memory card") 30 (see FIG. 2) is inserted. The memory card 30 is employed for loading the game program, etc. read from the optical disk 18 to temporarily store it, storing (saving) game data (result data or proceeding data of the game) of the game played by means of the game system 10, and so forth. It should be noted that storing the game data described above may be performed, in place of the memory card 30, on an internal memory by providing the internal memory, such as a flash memory, etc. inside the video game apparatus 12.

The video game apparatus 12 has an AV cable connector (not illustrated) on the rear surface of the housing 14, and by utilizing the connector, a monitor 34 is connected to the video game apparatus 12 via an AV cable 32a. The monitor 34 is typically a color television receiver, and the AV cable 32a inputs a video signal from the video game apparatus 12 to a video input terminal of the color television, and inputs a sound signal to a sound input terminal. Accordingly, a game image of a three-dimensional (3D) video game, for example, is displayed on the screen of the color television (monitor) 34, and stereo game sound, such as a game music, a sound effect, etc. is output from right and left speakers 34a.

Additionally, around the monitor 34 (upper side in this embodiment), a sensor bar 34b is provided, and the sensor bar 34b is provided with two LED modules (hereinafter referred to as "marker") 340m and 340n with a predetermined distance therebetween. Each of the markers 340m and 340n is an infrared LED, and outputs infrared light toward the front of the monitor 34. A cable 32b extending from the sensor bar 34b is connected to a connector (not illustrated) on a rear surface of the video game apparatus 12, and a power is supplied to the markers 340m and 340n from the video game apparatus 12.

Furthermore, the power of the video game apparatus 12 is applied by means of a general AC adapter (not illustrated). The AC adapter is inserted into a standard wall socket for home use, and the video game apparatus 12 transforms the house current (commercial power supply) to a low DC voltage signal suitable for driving. In another embodiment, a battery may be utilized as a power supply.

In the game system 10, a user or a player turns the power of the video game apparatus 12 on for playing the game (or other applications). Then, the user selects an appropriate optical disk 18 storing a video game (or other applications the player wants to play), and loads the optical disk 18 on the disk drive 68 of the video game apparatus 12 through the disk slot 16. In response thereto, the video game apparatus 12 starts to execute a video game or other applications on the basis of the software stored in the optical disk 18. The user operates the controller 22 in order to apply an input to the video game apparatus 12.

Figure 2:
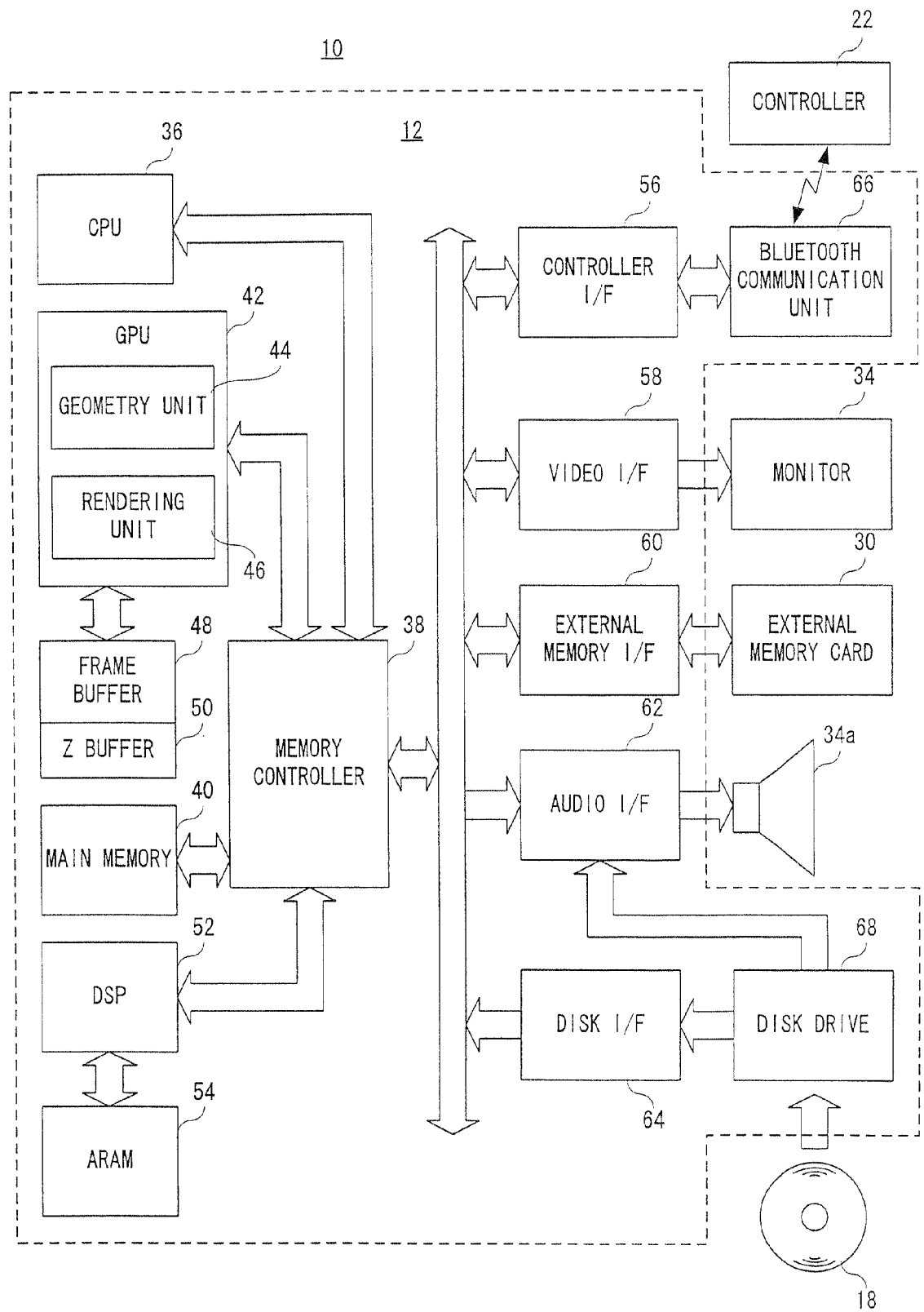
FIG. 2 is a block diagram showing an electrical configuration of the gaming system shown in FIG. 1.

FIG. 2 is a block diagram showing an electric configuration of the video game system 10 in FIG. 1 embodiment. A CPU 36 is provided in the video game apparatus 12. The CPU 36 is a computer which executes an overall control of the video game apparatus 12. The CPU 36 functions as a game processor, and is connected with a memory controller 38 via a bus. The memory controller 38 mainly controls writing and reading of a main memory 40 connected via the bus under the control of the CPU 36. The memory controller 38 is connected with a GPU (Graphics Processing Unit) 42.

The GPU 42 forms a part of a rendering means, and is constituted by a single chip ASIC, for example, receives a graphics command (rendering command) from the CPU 36 via the memory controller 38, and by following the command thus received, generates a 3D game image by a geometry unit 44 and a rendering unit 46. Namely, the geometry unit 44 performs arithmetic processing of rotation, movement, and deformation, etc. of each kind of object of three dimensional coordinate system (formed of a plurality of polygons, and the polygon refers to a polygonal plane defined by at least three vertexes coordinates.) The rendering unit 46 performs image generation processing such as attaching a texture (texture image) to each polygon of each kind of object, and so forth. Accordingly, the 3D image data to be displayed on the game screen is generated by the GPU 42, and the image data thus generated is stored in a frame buffer 48.

Note that necessary data (primitive or polygon and texture, etc) in performing the graphics command by the GPU 42 is obtained from the main memory 40 by the GPU 42 via the memory controller 38.

The frame buffer 48 is a memory for drawing (accumulating) the image data of one frame of a raster scan monitor 34, for example, and is overwritten for every one frame by the GPU 42. Specifically, the frame buffer 48 sequentially stores chromatic information of an image for each one pixel. Here, the chromatic information refers to data on R, G, B, A, and for example, corresponds to R (red) data of 8 bits, G (green) data of 8 bits, B (blue) data of 8 bits, and A (alpha) data of 8 bits. Note that A data is the data on a mask (mat image). The 3D image of the game image is displayed on the screen of the monitor 34 by reading the data of the frame buffer 48 via the memory controller 38 by a video I/F 58 as will be described later.

In addition, a Z buffer 50 has a storage capacity corresponding to the number of pixels corresponding to the frame buffer 48 X the number of bits of depth data per one pixel, and stores depth information or depth data (Z value) of dots corresponding to each storage location of the frame buffer 48.

Both of the frame buffer 48 and the Z buffer 50 may be constituted by using one portion of the main memory 40, and also these buffers may be provided inside the GPU 42.

In addition, the memory controller 38 is connected to a RAM for audio (referred to as "ARAM" hereafter) 54, via a DSP (Digital Signal Processor) 52. Accordingly, the memory controller 38 controls writing and/or reading of the ARAM 54 as a sub-memory as well as that of the main memory 40.

The DSP 52 works as a sound processor, and generates audio data corresponding to sound, voice, sound effect or music necessary for the game, by using sound data (not shown) stored in the main memory 40 and by using sound wave (tone) data (not shown) written in the ARAM 54.

The memory controller 38 is further connected to each interface (I/F) 56, 58, 60, 62, and 64 by the bus. The controller I/F 56 is an interface for the controller 22 connected to the video game apparatus 12 via a Bluetooth communication unit 66. More specifically, the Bluetooth communication unit 66 receives input data sent from the controller 22, and the controller I/F 56 applies the input data to the CPU 36 through the memory controller 38. It should be noted that in this embodiment, the input data includes at least any one of operation data, acceleration data, and marker coordinate data described later. Also, the Bluetooth communication unit 66 receives data produced by the CPU 36 via the main memory 40 and the controller I/F 56, and transmits the data to the controller 22 to be transmitted. The CPU 36 produces sound output instruction data including audio data generated at the DSP 52 when outputting sound from a speaker 104 of the controller 22 (see FIG. 4), and has the Bluetooth communication unit 66 transmit the produced data to the controller 22. In addition, the CPU 36 produces vibration output instruction data including vibration control data when vibrating a vibrator 106 of the controller 22 (see FIG. 4), and has the produced data be transmitted from the Bluetooth communication unit 66. Moreover, the CPU 36 produces lighting instruction data including lighting control data when lighting the LED 76 of the controller 22 (see FIG. 3 and FIG. 4), and has the produced data be transmitted from the Bluetooth communication unit 66.

The video I/F 58 accesses the frame buffer 48, reads the image data generated by the GPU 42, and applies an image signal or the image data (digital RGBA pixel value) to the monitor 34 via the AV cable 32a (FIG. 1).

The external memory I/F 60 associates the memory card 30 inserted into the front face of the video game apparatus 12 with the memory controller 38. Whereby, the CPU 36 can write the data into the memory card 30, or can read out the data from the memory card 30 via the memory controller 38. The audio I/F 62 receives audio data given from the DSP 52 through the memory controller 38 or audio stream read from the optical disk 18, and gives an audio signal (sound signal) corresponding thereto to a speaker 34a of the monitor 34.

Further, the disk I/F 64 connects the disk drive 68 to the memory controller 38, and therefore the CPU 36 controls the disk drive 68. By this disk drive 68, program and data read out from the optical disk 18 are written into the main memory 40 under the control of the CPU 36.

Additionally, in FIG. 2, for simplicity, the sensor bar 34b and the power supply circuit are omitted.

Figure 3:
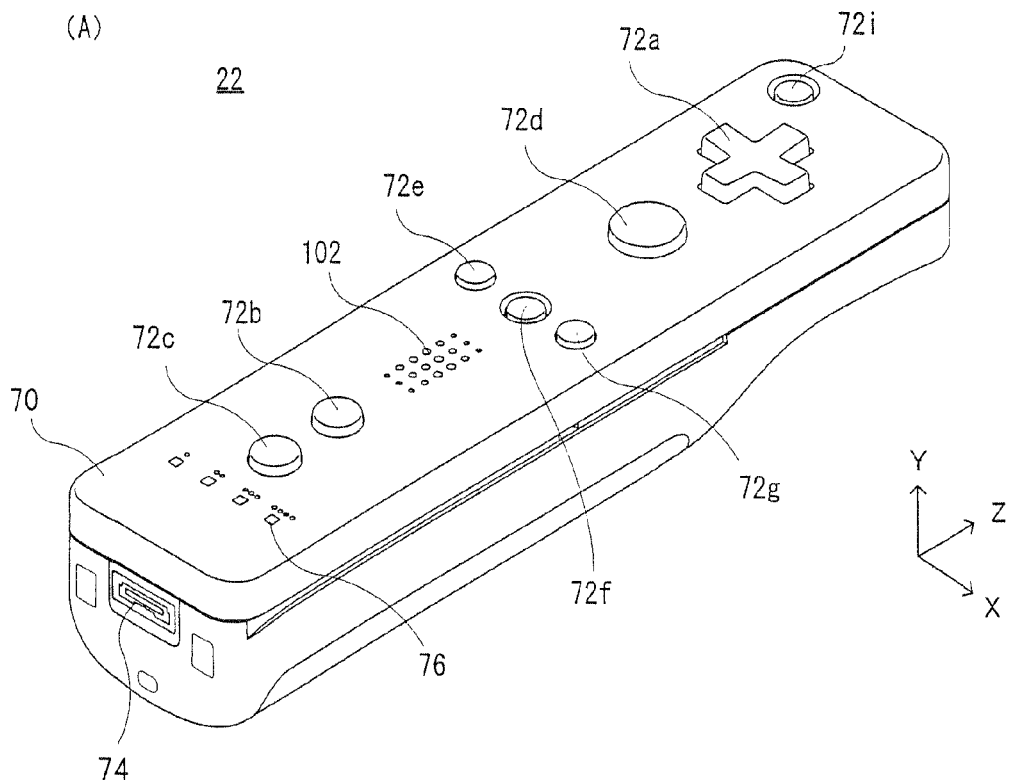
FIG. 3 is an illustrative view showing an appearance of a controller shown in FIG. 1, where
Figure 3:
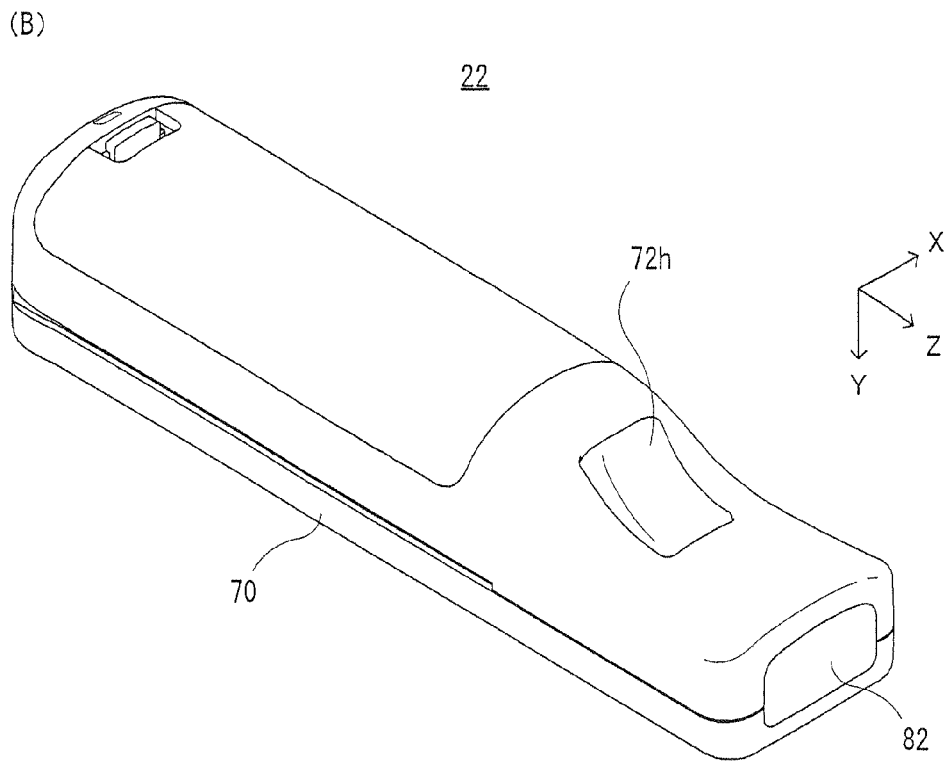

FIG. 3 shows one example of an external appearance of the controller 22. FIG. 3(A) is a perspective view viewing the controller 22 from above rear, and FIG. 3(B) is a perspective view viewing the controller 22 from below front.

The controller 22 has a housing 70 formed by plastic molding, for example. The housing 70 is formed into an approximately rectangular parallelepiped shape regarding a back and forth direction (Z-axis direction shown in FIG. 3) as a longitudinal direction, and has a size small enough to be held by one hand of a child and an adult. As one example, the housing 70 has a length or a width approximately the same as that of the palm of the person. A player can perform a game operation by means of the controller 22, that is, by pushing buttons provided on it and by changing a position and a direction of the controller 22 itself.

The housing 70 is provided with a plurality of operation buttons. That is, on the top surface of the housing 70, a cross key 72a, an X button 72b, a Y button 72c, an A button 72d, a select switch 72e, a menu switch 72f, and a start switch 72g are provided. Meanwhile, on the bottom surface of the housing 70, a concave portion is formed, and on the reward inclined surface of the concave portion, a B button 72h is provided. Each of the buttons (switches) 72a-72h is assigned an appropriate function according to a game program to be executed by the game apparatus 12. Furthermore, the housing 70 has a power switch 72i for turning on/off the power of the main body of the game apparatus 12 on a top surface from a remote place. The respective buttons (switches) provided on the controller 22 may inclusively be indicated with the use of the reference numeral 72.

At the back surface of the housing 70, an external expansion connector 74 is provided. At the back end of the top surface of the housing 70, a plurality of LEDs 76 is provided, and the plurality of LEDs 76 shows a controller number (identification number of the controller) of the controller 22. The game apparatus 12 can be connected with a maximum four controllers 22, for example. If a plurality of controllers 22 is connected to the game apparatus 12, a controller number is applied to the respective controllers 22 in the order connected, for example. Each LED 76 corresponds to a controller number, and the LED 76 corresponding to the controller number lights up.

Furthermore, inside the housing 70 of the controller 22, an acceleration sensor 78 (FIG. 4) is provided. As an acceleration sensor 78, acceleration sensors of an electrostatic capacity type can typically be utilized. The acceleration sensor 78 detects accelerations of a linear component for each sensing axis and gravitational acceleration out of the accelerations applied to a detection portion of the acceleration sensor. The acceleration sensor 78 detects accelerations of at least two axes which are orthogonal with each other. For the two-axis or three-axis acceleration sensor, for example, the acceleration applied to the detection portion of the acceleration sensor is detected as accelerations of linear components along the respective axes. More specifically, in this embodiment, a three-axis acceleration sensor is applied to detect the respective accelerations in directions of three axes of a up and down direction (Y-axial direction shown in FIG. 3), a right and left direction (X-axial direction shown in FIG. 3), and a forward and rearward direction (Z-axial direction shown in FIG. 3) of the controller 22. The acceleration detected for each axis of the acceleration sensor 78 is subjected to a predetermined arithmetic process, to thereby calculate a slope and a rotation of the controller 22. For example, gravitational acceleration is constantly applied even in a state that the acceleration sensor 78 stands still, and acceleration corresponding to a slope of each axis with respect to the gravitational acceleration is detected for each axis. More specifically, when the acceleration sensor 78 stands still in a horizontal state (that is, X and Z-axis directions are a horizontal direction, and a Y-axis direction is a vertical direction), the gravitational acceleration of 1G is applied to the Y-axis of the acceleration sensor 78, and the gravitational accelerations to the other X and Z-axes are 0. When the acceleration sensor 78 is sloped from the horizontal state, the gravitational acceleration is distributed into each axis of the acceleration sensor 78 depending on angles formed by each axis direction of the acceleration sensor 78 and the gravitational direction, and at this time, an acceleration value of each axis of the acceleration sensor 78 is detected. An arithmetic operation is performed on the acceleration value for each axis, to thereby calculate the orientation of the acceleration sensor 78 with respect to the direction of the gravitational acceleration.

It should be noted that as an acceleration sensor 78, two-axis acceleration sensors may be utilized for detecting any two of the directions of the accelerations out of the up and down direction, the right and left direction and the back and forth direction according to the shape of the housing 70, the limitation on how to hold the controller 22, or the like.

In addition, the controller 22 has an imaged information arithmetic section 80 (see FIG. 4), and as shown in FIG. 3(B), on the front end surface of the housing 70, light incident opening 82 of the imaged information arithmetic section 80 is provided.

Furthermore, a plurality of holes 102 is formed between the menu switch 72f and the X button 72b on the top surface of the housing 70. A speaker 104 (see FIG. 4) is provided inside the housing 70 at the position corresponding to these holes 102, and therefore it is possible to provide the player with a sound form the controller 22 at hand too.

In addition, a vibrator 106 (see FIG. 4) is provided inside the housing 70. The vibrator 106 may be a vibration motor or a solenoid, for example. The vibrator 106 produces a vibration in the controller 22, and therefore it is possible to transmit the vibration to the hand of the player holding it.

Furthermore, the controller 22 is powered by a battery (not illustrated) detachably incorporated in the housing 70. Additionally, the shapes of the controller 22 shown in FIG. 3 and the shape, the number and the setting position of the buttons (switches, stick, or the like) are merely one example, and can be changed to other shapes, numbers and setting positions, etc. as needed.

Figure 4:
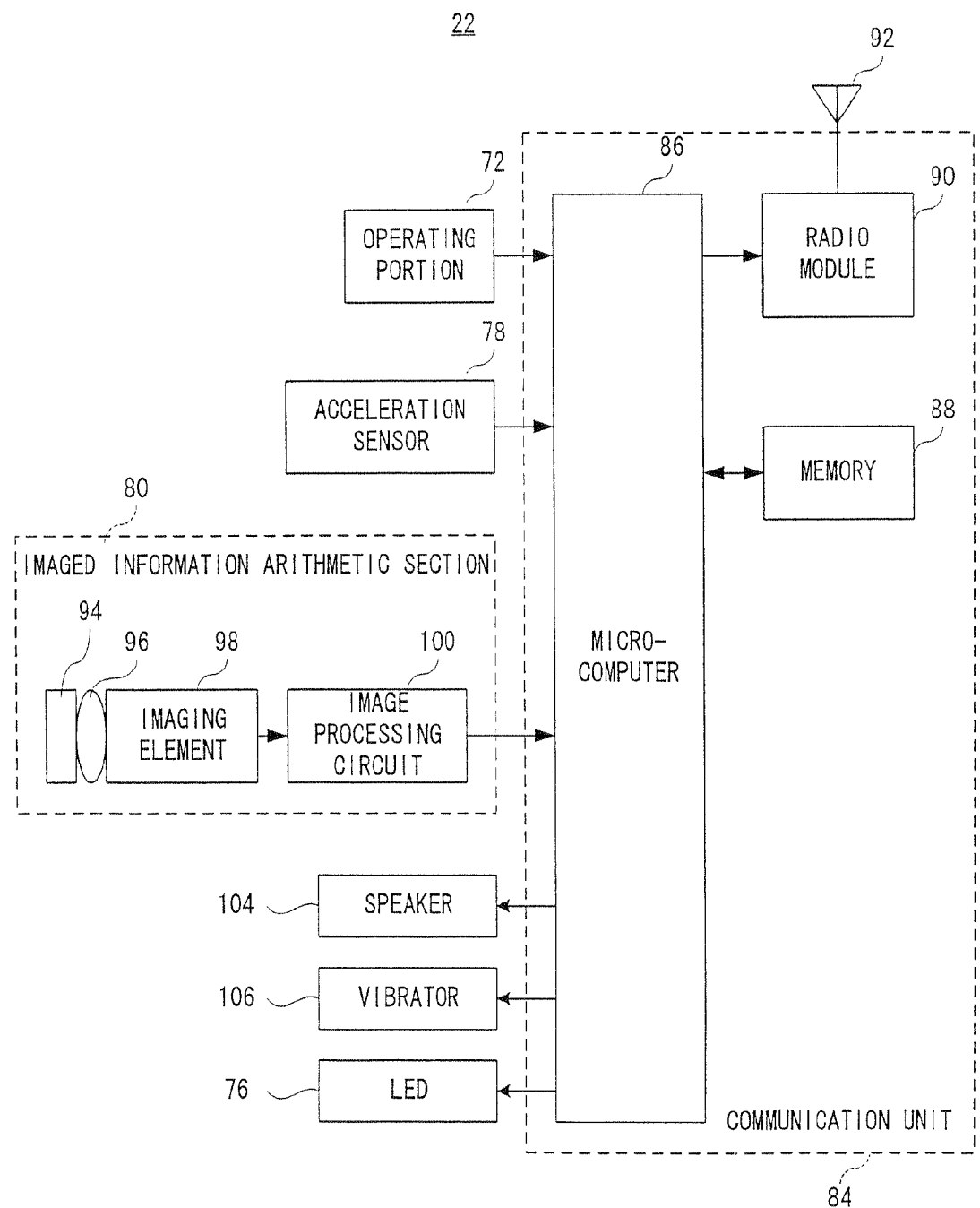
FIG. 4 is a block diagram showing an electrical configuration of a controller shown in FIG. 1.

FIG. 4 is a block diagram showing the electric configuration of the controller 22. Referring to FIG. 4, the controller 22 includes The controller 22 incorporates a communication unit 84, and the communication unit 84 is connected with the operating portion 72, the acceleration sensor 78, the imaged information arithmetic section 80, the speaker 104, the vibrator 106 and the LEDs 76. It should be noted that although omitted in FIG. 4, the communication unit 84 is also connected with above-described connector 74 and the power supply circuit not shown, etc.

The communication unit 84 includes a microcomputer (micon) 86, a memory 88, a radio module 90 and an antenna 92. The micon 86 transmits the obtained data to the game apparatus 12 and receives data from the game apparatus 12 by controlling the radio module 90 while using the memory 88 as a memory area (working area and buffer area) in processing.

The operating portion 72 indicates the above-described operation buttons or operation switches 72a-72i. When the operating portion 72 is operated, a manipulate signal is applied to the communication unit 84.

The data indicative of acceleration of each axis detected by the acceleration sensor 78 is output to the communication unit 84. The acceleration sensor 78 has in the order of a maximum sampling period of 200 frames per second, for example.

The data obtained by the imaged information arithmetic section 80 is also output to the communication unit 84. The imaged information arithmetic section 80 is made up of an infrared filter 94, a lens 96, an imaging element 98, and an image processing circuit 100. The infrared filter 94 passes only infrared rays from the light incident opening 82 in front of the controller 22. As described above, the markers 340m and 340n placed near (around) the display screen of the monitor 34 are infrared LEDs for outputting infrared lights forward the monitor 34. Accordingly, by providing the infrared filter 94, it is possible to image the image of the markers 340m and 340n more accurately. The lens 96 condenses the infrared rays passing thorough the infrared filter 94 to emit them to the imaging element 98. The imaging element 98 is a solid-state image sensing device, such as a CMOS sensor and a CCD, for example, and images the infrared rays condensed by the lens 96. Accordingly, the imaging element 98 images only the infrared rays passing through the infrared filter 94 to generate image data. Hereafter, the image imaged by the imaging element 80c is called an "imaged image". The image data generated by the imaging element 98 is processed by the image processing circuit 100. The image processing circuit 100 calculates a position of an imaging objective (markers 340m and 340n) within the imaged image, and outputs marker coordinate data including each coordinate value indicative of the position to the micon 86 at predetermined time intervals (one frame, for example). It should be noted that a description of processing of the image processing circuit 100 is made later.

The data output from the operating portion 72, the acceleration sensor 78, and the imaged information arithmetic section 80 to the micon 86 is temporarily stored in the memory 88. The radio transmission from the communication unit 84 to the Bluetooth communication unit 66 of the game apparatus 12 is performed every predetermined cycle. The game processing is generally performed by regarding 1/60 seconds as a unit, and therefore, it is necessary to perform the transmission from the controller 22 at a cycle equal to or shorter than it. The micon 86 outputs data including the operation data of the operating portion 72, the acceleration data of the acceleration sensor 78, and the marker coordinate data of the imaged information arithmetic section 80, etc. stored in the memory 88 to the radio module 90 as controller data (input data), when transmission timing to the game apparatus 12 has come. The radio module 90 modulates a carrier of a predetermined frequency by the input data, and emits its weak radio wave signal from the antenna 92 by using a short-range wireless communication technique, such as Bluetooth. Namely, the input data is modulated to the weak radio wave signal by the radio module 90 and transmitted from the controller 22. The weak radio wave signal is received by a Bluetooth communication unit 66 of the game apparatus 12. The weak radio wave thus received is subjected to demodulating and decoding processing, thus making it possible for the game apparatus 12 to obtain the input data. The CPU 36 of the game apparatus 12 performs the game processing on the basis of the input data obtained from the controller 22.

Moreover, the communication unit 84 receives a weak radio signal from the game apparatus 12 via the antenna 92, demodulates and decodes the received weak radio signal by the radio module 90, and obtains the data transmitted from the game apparatus 12. When the received data is data instructing sound output, the micon 86 outputs the audio data included in the received data to the speaker 104 via a D/A converter and an amplifier not shown in the drawing, and has the speaker 104 outputs the sound. Further, when the received data is data instructing vibration output, the micon 86 controls vibration of the vibrator 106 based on the data. In addition, when the received data is data instructing lighting of the LED 76, the micon 86 controls lighting of the LED 76 based on the data.

Figure 5:
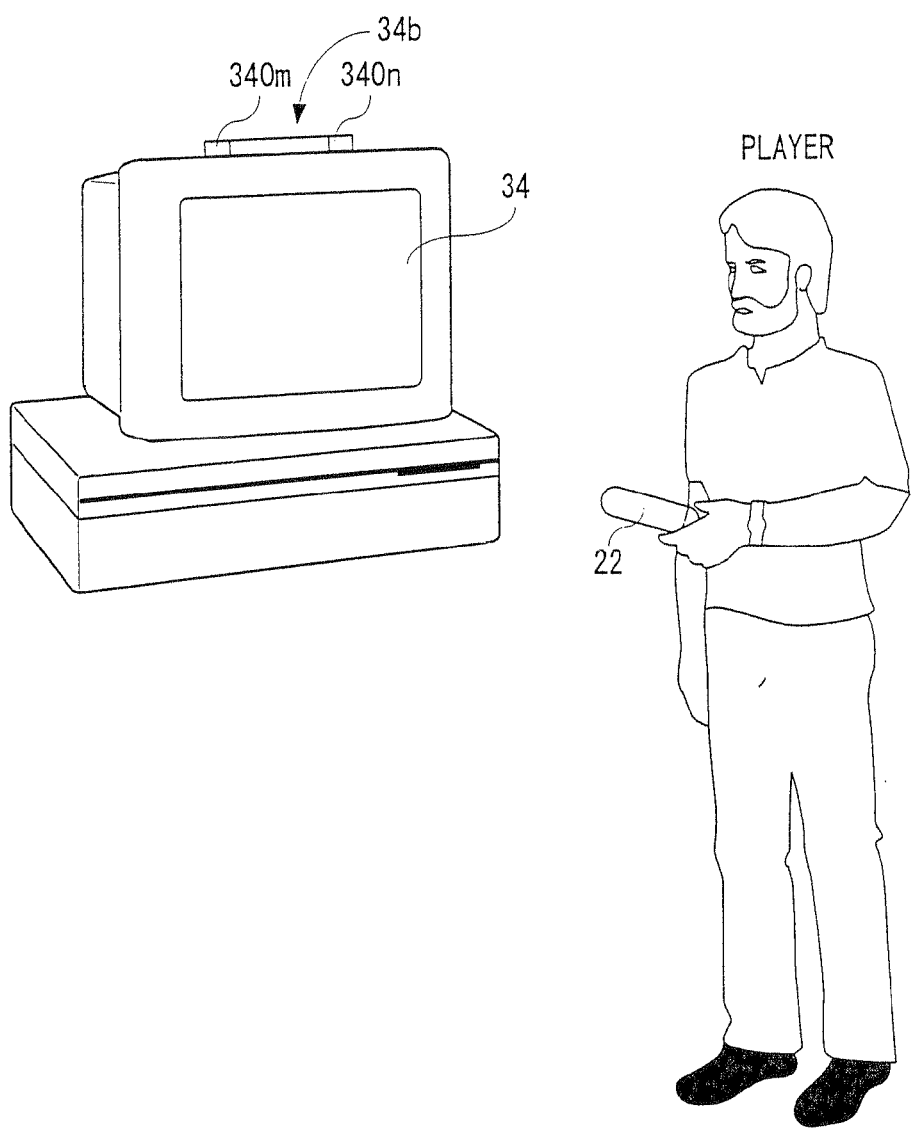
FIG. 5 is an illustrative view for explaining a state where a game is played using the controller shown in FIG. 1.

FIG. 5 is an illustrative view summarizing a state when a player plays a game by utilizing a controller 22. As shown in FIG. 5, when playing the game by means of the controller 22 in the video game system 10, the player holds the controller 22 with one hand. Strictly speaking, the player holds the controller 22 in a state that the front end surface (the side of the light incident opening 82 of the light imaged by the imaged information arithmetic section 80) of the controller 22 is oriented to the markers 340m and 340n. It should be noted that as can be understood from FIG. 1, the markers 340m and 340n are placed in a vicinity of a predetermined side (upper side or lower side) of the screen of the monitor 34 and in parallel with the predetermined side. In this state, the player performs a game operation by moving the controller 22, that is, changing a position on the screen indicated by the controller 22, and changing a distance between the controller 22 and each of the markers 340m and 340n.

Figure 6:
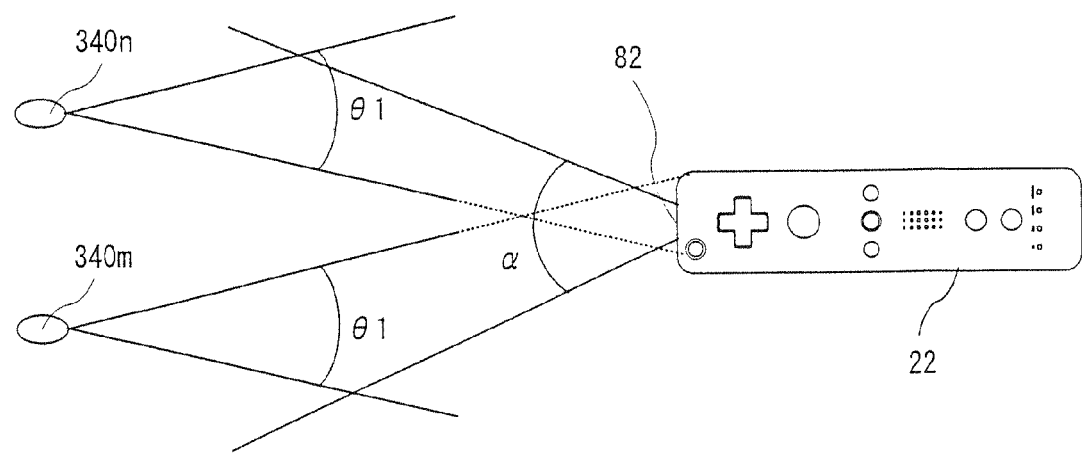
FIG. 6 is an illustrative view for explaining a viewing angle of markers and the controller shown in FIG. 1.

FIG. 6 is a view showing viewing angles between the respective markers 340m and 340n, and the controller 22. As shown in FIG. 6, each of the markers 340m and 340n emits infrared ray within a range of a viewing angle θ1. Also, the imaging element 98 of the imaged information arithmetic section 80 can receive incident light within the range of the viewing angle α taking the line of sight of the controller 22 (Z axial direction shown in FIG. 3) as a center. For example, the viewing angle θ1 of each of the markers 340m and 340n is 34° (half-value angle θ1 while the viewing angle α of the imaging element 98 is 42°. The player holds the controller 22 such that the imaging element 98 is directed and positioned so as to receive the infrared rays from the markers 340m and 340n. More specifically, the player holds the controller 22 such that at least one of the markers 340m and 340n exists in the viewing angle α of the imaging element 98, and the controller 22 exists in at least one of the viewing angles θ1 of the marker 340m or 340n. In this state, the controller 22 can detect at least one of the markers 340m and 340n. The player can perform a game operation by changing the position and the orientation of the controller 22 in the range satisfying the state. It should be noted that when only one of the markers 340*m* and 340*n* is detected, instructed position of the controller 22 can be calculated, by utilizing the data detected immediately before in which the two markers 340*m* and 340*n* are detected, and setting temporary marker coordinate in place of the other marker that is not detected, for example.

If the position and the orientation of the controller 22 are out of the range, the game operation based on the position and the orientation of the controller 22 cannot be performed. Hereafter, the above-described range is called an "operable range."

Figure 7:
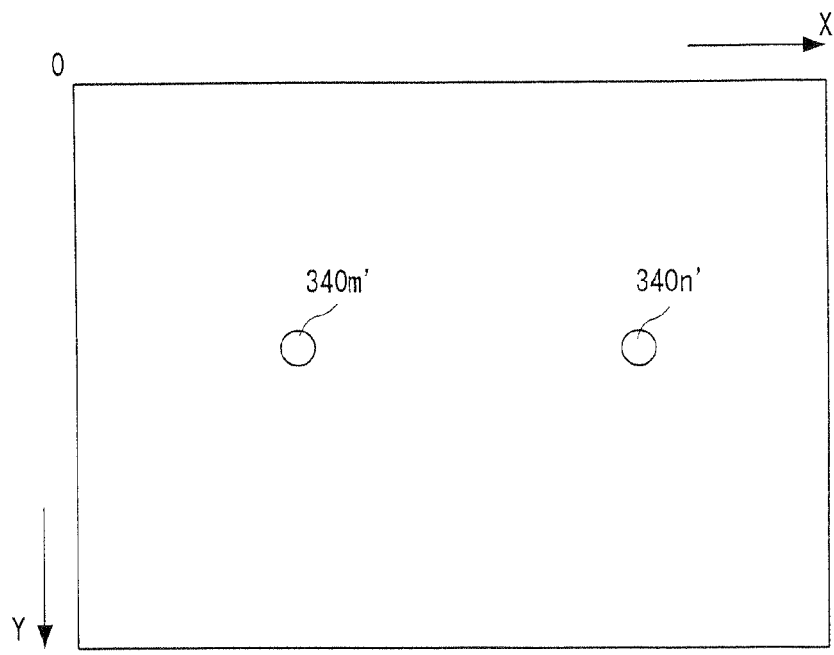
FIG. 7 is an illustrative view of one example of imaged images including an object image.

If the controller 22 is held within the operable range, an image of each of the markers 340*m* and 340*n* is imaged by the imaged information arithmetic section 80. That is, the imaged image obtained by the imaging element 98 includes an image (object image) of each of the markers 340*m* and 340*n* as an imaging objective. FIG. 7 is a view showing one example of the imaged image including an object image. The image processing circuit 100 calculates coordinates (marker coordinates) indicative of the position of each of the markers 340*m* and 340*n* in the imaged image by utilizing the image data of the imaged image including the object image 340*m*' and 340*n*'.

Since the object images 340*m*' and 340*n*' appear as a high-intensity part in the image data of the imaged image, the image processing circuit 100 first detects the high-intensity part as a candidate of the object image. Next, the image processing circuit 100 determines whether or not the high-intensity part is an object image on the basis of the size of the detected high-intensity part. The imaged image may include images other than the object image due to sunlight through a window and light of a fluorescent lamp in the room as well as the images 340*m*' and 340*n*' of the two markers 340*m* and 340*n*. The determination processing whether or not the high-intensity part is an object image is executed for discriminating the images 340*m*' and 340*n*' of the two markers 340*m* and 340*n* from the images other than them, and accurately detecting the object image. The imaging objective 340*m* and 340*n* need to be known for discriminating the object images 340*m*' and 340*n*' from the other images in the imaged image. In this embodiment, the size of the imaging objective is determined in advance, and therefore, it is possible to estimate the size of the marker images 340*m*' and 340*n*'. Accordingly, it is possible to execute a determination of the marker images 340*m*' and 340*n*' based on the size of the high-intensity part. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 100 calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imaging element 98. Now, the resolution of the imaged image imaged by the imaging element 98 shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system of the imaged image) taking the upper left of the imaged image as an origin point, the downward direction as an Y-axis positive direction, and the right direction as an X-axis positive direction.

Also, if the object image is properly detected, two high-intensity parts are determined as an object image by the determination process, and therefore, two marker coordinates are calculated. The image processing circuit 100 outputs data indicative of the calculated two marker coordinates. The output data (marker coordinate data) is included in the input data by the micon 86 as described above, and transmitted to the video game apparatus 12.

The video game apparatus 12 (CPU 36) detects the marker coordinate data from the received input data to thereby calculate an instructed position (instructed coordinate) by the controller 22 on the screen of the monitor 34 and a distance from the controller 22 to each of the markers 340*m* and 340*n* on the basis of the marker coordinate data. More specifically, the position of the mid point of the two marker coordinates is adopted (calculated) as a position to which the controller 22 faces, that is, an instructed position. It should be noted that when the controller 22 points to the left end of the screen of the monitor 34, the object images are detected in right side in the imaged image, and when the controller 22 points to the lower end of the screen, the object images are detected in the upper side in the imaged image, for example. Therefore, when the coordinate of the instructed position by the controller 22 is calculated from the marker coordinate, the coordinate system is appropriately transformed from the coordinate system of the imaged image of FIG. 7.

In this embodiment, marker coordinates are detected by performing a predetermined calculation process with the controller 22 on imaged data, and then, the marker coordinate data is transmitted to the video game apparatus 12. However, in another embodiment, the imaged data may be transmitted as input data from the controller 22 to the video game apparatus 12, and the CPU 36 of the video game apparatus 12 may detect the marker coordinates by performing the predetermined calculation process on the imaged data.

Further, a distance between the object images in the imaged image varies depending on the distances between the controller 22 and the markers 340*m* and 340*n*. Therefore, by calculating a distance between the two marker coordinates, the video game apparatus 12 can perceive the distances between the controller 22 and the markers 340*m* and 340*n*.

As described above, this gaming system 10 is provided with a mechanism as a pointing device for instructing a position on a display surface of the monitor 34 with the controller 22. The video game apparatus 12 performs information processing such as various gaming processes using the input data from the controller 22, and displays the results on the monitor 34 as a display apparatus. For example, the video game apparatus 12 determines, based on the position pointed by the controller 22 and a position of an object on the display screen, whether or not the object is pointed, and performs a gaming process corresponding to the result. As an example, by directing a Z axis of the controller 22 toward a target on the display screen, it is possible to execute a game in which the target may be aimed and shot.

However, a size of the display surface of the monitor 34 and a position where the player stands vary depending on circumstances of each family, and accordingly, there is a risk that the position on the display screen at which the player intends to point does not match the position recognized by the gaming system 10. Therefore, in order to match the position pointed by the player with the controller 22 and the position recognized on the display screen, this gaming system 10 is configured so that the distance between the controller 22 and the display screen (markers 340m and 340n) can be adjusted so as to be an appropriate distance.

The appropriate distance from the monitor 34 (markers 340m and 340n) varies depending on a width of the display surface of the monitor 34 and an interval between the markers 340m and 340n. Accordingly, in order to calculate the appropriate distance, it is necessary to obtain information about the interval between the markers 340m and 340n and the width of the display surface of the monitor 34. In this embodiment, the width of the sensor bar 34b is previously determined, i.e., the two markers 340m and 340n are positioned with a predetermined distance therebetween, and the width of the display surface of the monitor 34 is obtained using this width of the sensor bar 34b.

Figure 8:
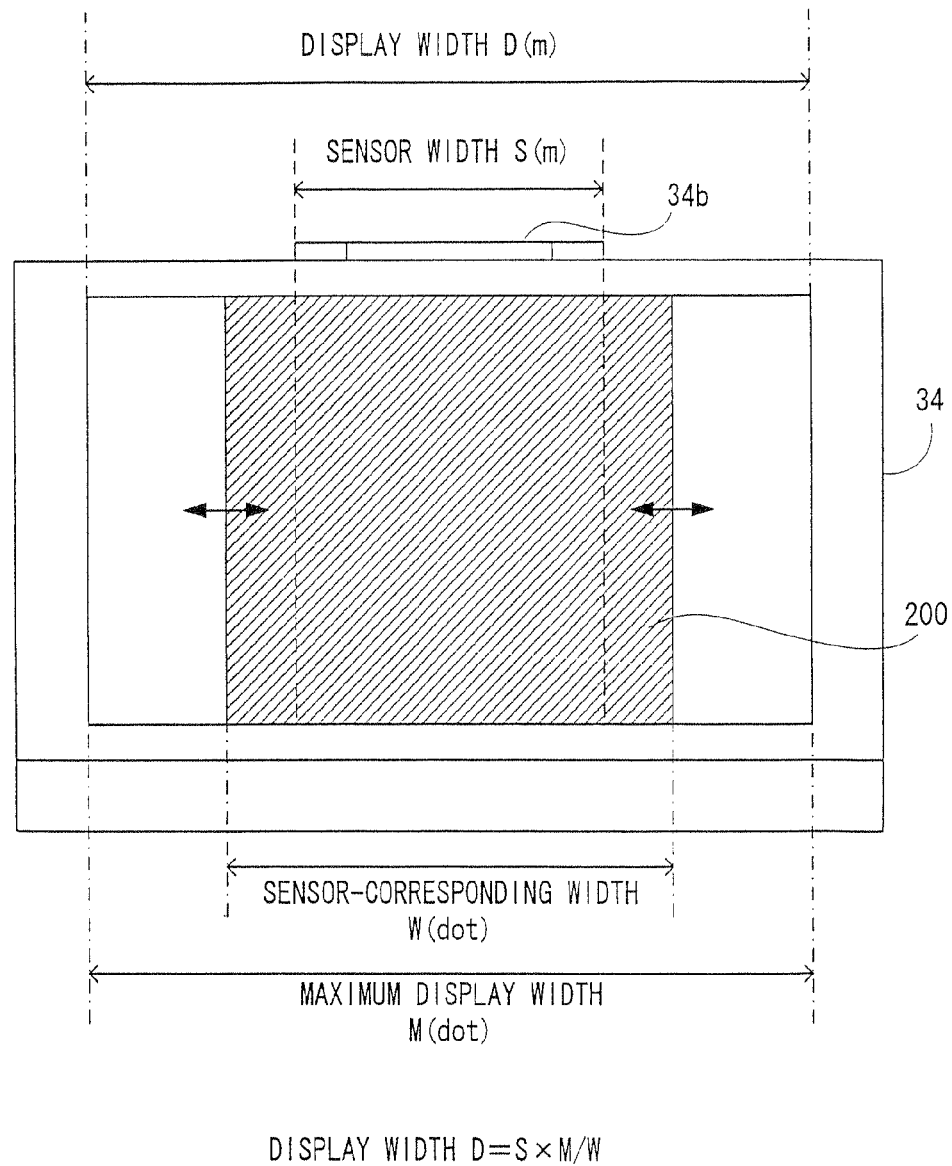
FIG. 8 is an illustrative view for explaining an input of a sensor-corresponding width for calculating a display width.
Figure 8:
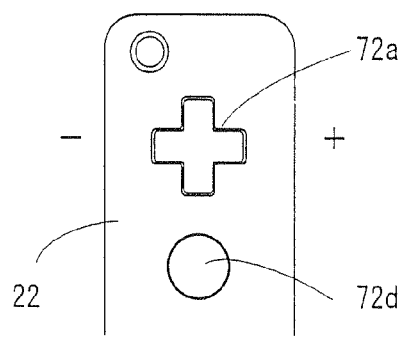

As shown in FIG. 8, the two markers 340m and 340n in the sensor bar 34b are positioned in a vicinity of one of upper and lower sides of the display surface of the monitor 34 so that a positioning direction of the two markers is parallel with the one of the sides. Further, the sensor bar 34b is positioned in the center of the one of the sides so that a center point of the two markers 340m and 340n matches a center of the display surface in widthwise direction. Then, an image 200 with a variable width is displayed in the center of the display screen, and the player is requested to operate so as to change a width of the image 200 on the display screen in a direction in which the two markers 340m and 340n are positioned to match with the interval between the two markers 340m and 340n. For example, the display of the image 200 is controlled so that pressing a right direction of the cross key 72a of the controller 22 widens the width of the image 200 in widthwise direction by a predetermined length (dot), and pressing a left direction of the cross key 72a narrows the width of the image 200 by a predetermined length. By operating this cross key 72a so that the width of the image 200 matches the width of the sensor bar 34b and pressing an A button 72d, the width of the image 200 may be determined, and accordingly, the interval between the two markers 340m and 340n may be measured based on a unit (pixel) of the image. The width of the image 200 is referred to as a sensor-corresponding width. Specifically, the sensor-corresponding width is the width within the display screen corresponding to an actual width distance of the sensor bar 34b, and indicates the distance in the image. Note that the width of the sensor bar 34b, i.e., an actual distance between the markers 340m and 340n is referred to as a sensor width.

Because a maximum width of an image capable of being displayed on the display screen (referred to as a maximum display width) is previously determined, it is possible to calculate the width of the display screen of the monitor 34 (referred to as a display width) by obtaining the sensor-corresponding width. Scales or units for the display width, the sensor width, the sensor-corresponding width, and the maximum display width are different. The display width and the sensor width are expressed in a first scale (i.e. a unit for measuring a length in a real space: m (meter)), and the sensor-corresponding width and the maximum display width are expressed in a second scale (i.e. a unit for a digital image: dot (pixel)). The maximum display width is also the maximum width of the display surface in the second scale.

When the display width is D (m), the sensor width is S (m), the sensor-corresponding width is W (dot), and the maximum display width is M (dot), the display width is calculated based on the following equation 1.

$$D = S \times M / W \tag{1}$$

As described above, the display width is calculated based on a ratio between the sensor width and the sensor-corresponding width (S/W), and based on the maximum display width. Alternatively, the display width is calculated based on a ratio between the maximum display width and the sensor-corresponding width (M/W), and based on the sensor width.

As can be seen from FIG. 8, the display surface of the monitor 34 of this embodiment is a horizontally elongated rectangle, and the width of the display surface corresponds to the maximum width as is. As the display width, the maximum width of the display surface is obtained.

Once the display width and the sensor width are determined, ideal positional relation for pointing to the display surface by the controller 22 is determined. Accordingly, it is possible to calculate the appropriate distance between the controller 22 and the display surface based on the display width the sensor width.

Figure 9:
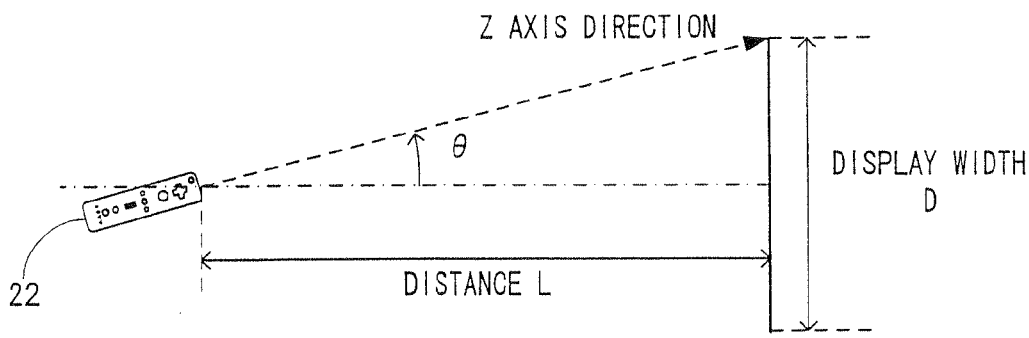
FIG. 9 is an illustrative view of positional relation, among the controller, a display screen, and the markers, for calculating an appropriate distance, where
Figure 9:
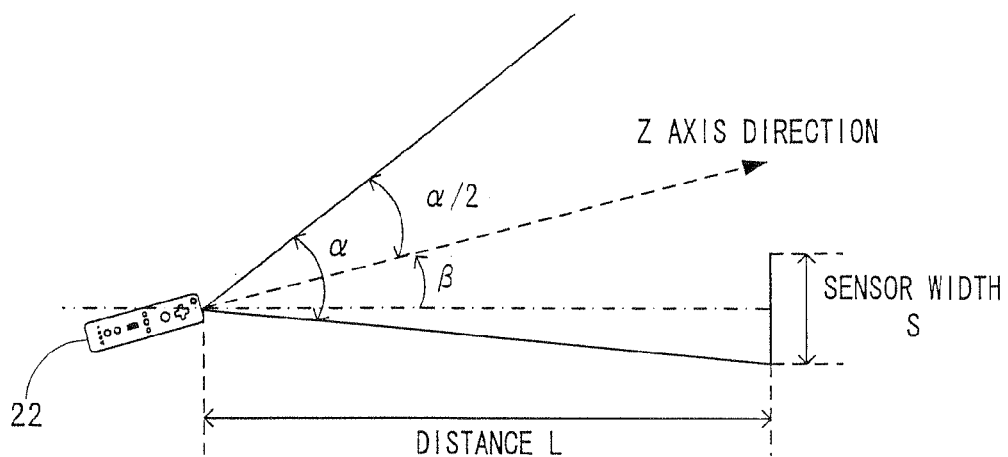

FIG. 9 shows positional relation among the controller 22, the display surface, and the sensor bar 34b for calculating the appropriate distance. As one example, FIG. 9 illustrates a situation where the left end of the display surface on which the sensor bar 34b is positioned.

Specifically, FIG. 9(A) shows the positional relation between the controller 22 and the display surface when an ideal pointing to the left end of the display screen is performed. FIG. 9A shows a situation of the pointing viewed from the top. Presumption is that the controller 22 is positioned on a normal line of the display surface at the center. Further, in order to point the left end of the display screen, the Z axis of the controller 22 is directed toward the left end of the display surface. This is a situation where the Z axis of the controller 22 is swung from the center of the display surface to the left by an angle θ. When the distance from the controller 22 to the display surface is L (m) and the display width is D, the angle θ in this pointing situation is calculated by the following equation 2.

$$\theta = \arctan(D/2L) \tag{2}$$

On the other hand, FIG. 9(B) shows positional relation as a limit of the recognition when the controller 22 is swung toward left, i.e., a limit for imaging the two markers 340m and 340n of the sensor bar 34b with the imaging element 98 of the imaging information arithmetic section 80 of the controller 22. A line defining a right end of a viewing angle a of the imaging element 98 matches the right end of the sensor bar 34b. This is a situation where the Z axis of the controller 22 is swung from the center of the display surface to the left by an angle β. When the distance from the controller 22 to the display surface (markers 340m and 340n) is L (m), the sensor width is S, and the viewing angle of the imaging element 98 is a, the angle β in this pointing situation is calculated by the following equation 3.

$$\beta = a/2 - \arctan(S/2L) \tag{3}$$

If the limit of the recognition of the pointed position by the controller 22 is when the controller 22 is directed toward the end of the display surface, the player can perform an ideal pointing comfortably. Therefore, by calculating the distance L so that θ=β is established, the appropriate distance may be obtained.

As described above, the appropriate distance according to the width of the display surface of the monitor 34 and the distance between the markers 340m and 340n can be grasped.

Figure 10:
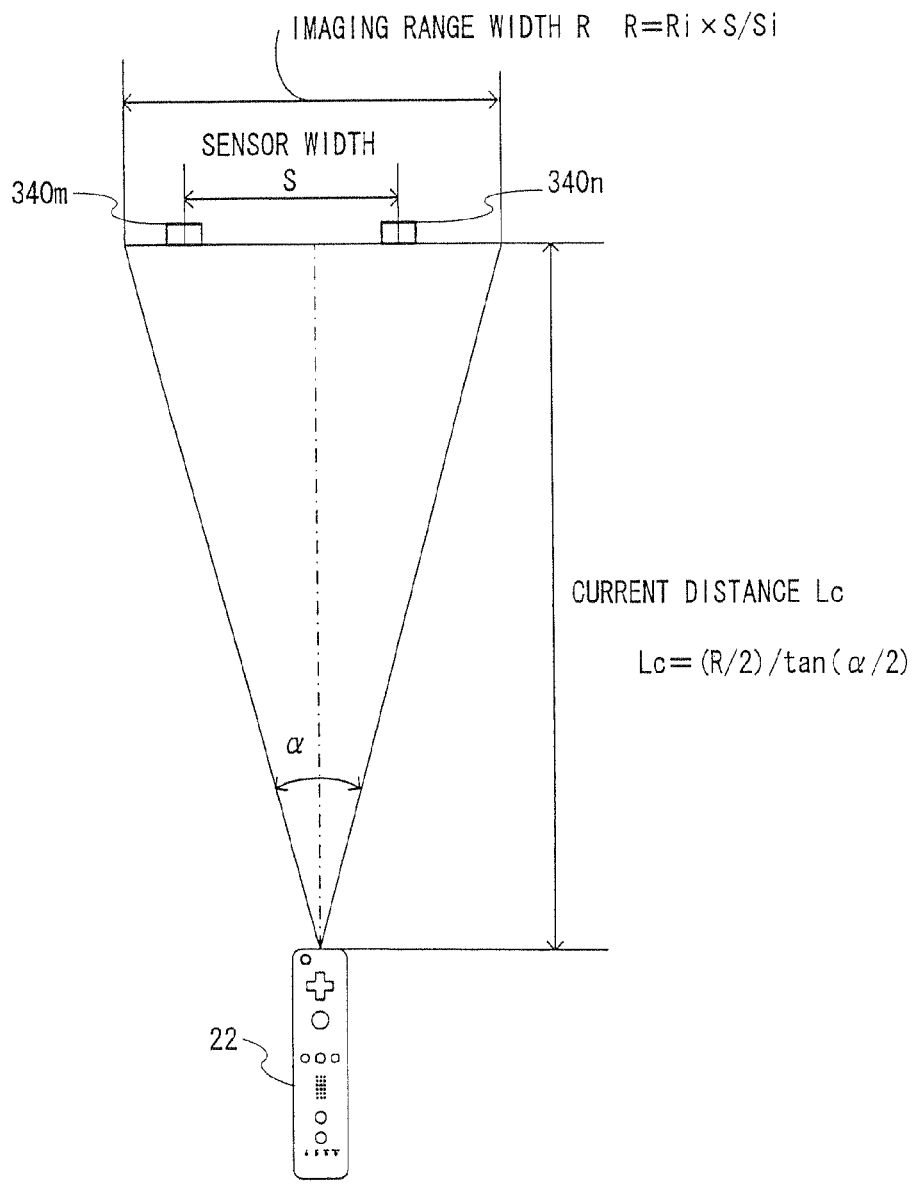
FIG. 10 is an illustrative view for explaining a method of calculating a current distance from the two markers to the controller.

Next, a method for calculating the current distance from the markers 340m and 340n to the controller 22 is explained by referring to FIG. 10. The current distance Lc is calculated using a distance Si between two marker images 340$m'$ and 340$n'$ on the imaged image.

Specifically, in this embodiment, first, the distance Si between the marker images 340$m'$ and 340$n'$ on the imaged image is calculated. As described above, because coordinates of the images 340$m'$ and 340$n'$ on the imaged image (i.e., marker coordinates) is detected, the distance Si can be calculated from the marker coordinates. The distance Si is expressed in the second scale (dot) as the unit for measuring the length in the image.

Next, an imaging range width R is calculated. The imaging range width R indicates the length in the real space corresponding to a width of a range actually imaged by the imaging element 98. Among the imaging range width R, the sensor width S, an imaged image width Ri and the distance Si between the marker images, relation of R:S=Ri:Si is established. The imaged image width Ri (dot) is previously determined according to a specification of the imaging element 98. Further, the sensor width S (m) indicating the distance between the markers 340$m$ and 340$n$ in the real space is also fixed in this embodiment. Therefore, it is possible to calculate the imaging range width R according to the following equation 4.

$$R = Ri \times S/Si \quad (4)$$

The imaging range width R is expressed in the first scale (m) as a unit for measuring the length in the real space.

Further, from the imaging range width R and the viewing angle a of the imaging element 98, the current distance Lc (m) can be calculated according to the following equation 5.

$$Lc = (R/2)/\tan(a/2) \quad (5)$$

As described above, in the gaming system 10, the appropriate distance and the current distance between the controller 22 and the monitor 34 (markers 340$m$ and 340$n$) can be obtained, it is possible to inform the player of magnitude relation of the current distance and the appropriate distance. Therefore, the player can adjust the position of the controller 22, i.e. the distance from the player to the display screen so that the current distance becomes the appropriate distance. The method of calculating the distance from the marker to the controller 22 described here is a mere example. Although not explained in detail, it is also possible to calculate the current distance using, for example, a so-called focal length from the lens 96 to an imaging plane of the imaging element 98, the size of the marker image on the imaging plane (the distance between the marker images in this embodiment), and the distance between the real markers.

Notification of the relation between the appropriate distance and the current distance is performed by, in this embodiment, outputting an image display corresponding to a difference between the appropriate distance and the current distance.

Figure 11:
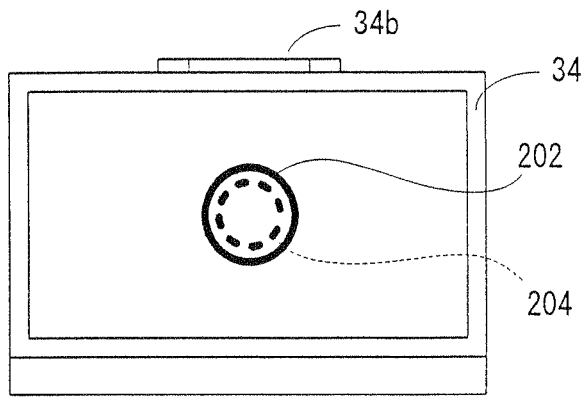
FIG. 11 is an illustrative view showing one example of images for notifying the relation between the current distance and the appropriate distance, where
Figure 11:
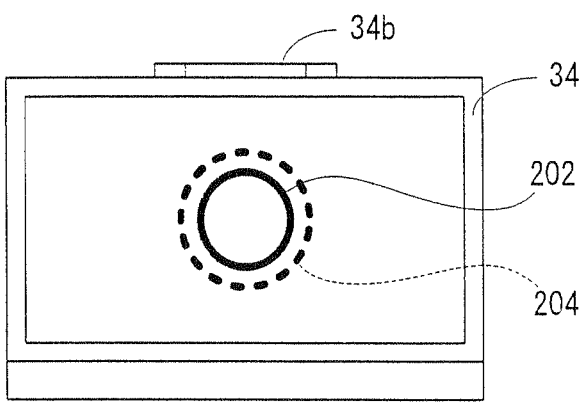
Figure 11:
Figure 11:

FIG. 11 shows examples of the image for notifying of the relation between the current distance and the appropriate distance. FIG. 11(A) shows a case where the current distance is longer than the appropriate distance, and FIG. 11(B) shows a case where the current distance is shorter than the appropriate distance. Displayed on the display screen are a reference image 202 (solid circle) indicating the appropriate distance and an adjustment image 204 (dashed circle) indicating the current distance. A size of the reference image 202 (diameter of the circle) is fixed at a predetermined value, and, on the other hand, a size of the adjustment image 204 changes in accordance with the current distance. Specifically, when the current distance is longer than the appropriate distance, the adjustment image 204 becomes smaller than the reference image 202, and when the current distance is shorter than the appropriate distance, the adjustment image 204 becomes larger than the reference image 202. Further, when the current distance is equal to the appropriate distance, a size of the adjustment image 204 is as large as that of the reference image 202. For example, the reference image 202 and the adjustment image 204 of the reference size are provided, then the adjustment image 204 enlarged or reduced into the size obtained by multiplying the ratio between the current distance Lc and the appropriate distance L (L/Lc) by the reference size is generated, thereby displaying the reference image 202 and the adjustment image 204. In this embodiment, the reference image 202 and the adjustment image 204 of the predetermined reference size regardless of the value of the appropriate distance are prepared, and the size of the adjustment image 204 is changed according to the ratio (L/Lc). However, in another embodiment, the reference size may be changed according to the value of the appropriate distance or the maximum width of the display surface.

Because the above notification corresponding to the relation between the current distance and the appropriate distance is performed, the player may easily adjust the position of the controller 22 to the position to be the appropriate distance by moving the controller 22 back and forth with respect to the monitor 34 with the Z axis direction of the controller 22 facing toward the sensor bar 34$b$, and with the size of the adjustment image matching to the size of the reference image on the display screen.

Note that, in another embodiment, it is also conceivable to display a message instructing the player to move closer or away from the display screen, as an image indicating the relation between the current distance and the appropriate distance, according to the difference between the current distance and the appropriate distance. It is also conceivable to display a value indicating the difference between the current distance and the appropriate distance.

Further, the notification method is not limited to the output of the image display using the display apparatus 34, and it is possible to appropriately modify to a different outputs using a different output apparatus. For example, it is also possible to notify by sound output instead of or along with the image display. Kinds, output patterns, or volume of sound such as a voice sound or a sound effect may be changed according to the relation between the current distance and the appropriate distance, as in a case of the image as described above, so that the player can know whether to move closer to or away from the display screen. For example, in a case where the voice sound is used, a voice sound such as "move closer to the display screen" when the current distance is longer than the appropriate distance, a voice sound such as "move away form the display screen" when the current distance is shorter than the appropriate distance, or a voice sound such as "appropriate" when the current distance is equal to the appropriate distance is outputted from a speaker 34$a$ or the speaker 104 of the controller 22. Taking an error into account, the current distance may be determined to be appropriate when the size of the difference between the current distance and the appropriate distance is not more than a predetermined threshold value. When the current distance is determined not to be appropriate, it is possible to output voice sound including, for example, a value of a distance required to be the distance determined to be appropriate as the appropriate distance. Furthermore, when using the sound effect, the distance to the display screen is notified by changing a kind, an output pattern, and a volume of the sound effect, according to the difference between the current distance and the appropriate distance.

Moreover, it is also possible to notify by a vibration output by a vibrator 104 of the controller 22 either independently or along with the image display and/or sound output. Also in the vibration output, similarly as in the image and the sound, a pattern and a degree, etc. of the vibration are changed according to the relation between the current distance and the appropriate distance.

Further, it is also possible to notify by light output of the LED 76 of the controller 22 along with any of the above described notification methods or independently. Also in the light output, similarly as in the above notification methods, a lighting pattern and brightness, etc. of a plurality of the LEDs 76 are changed according to the relation between the current distance and the appropriate distance.

Figure 12:
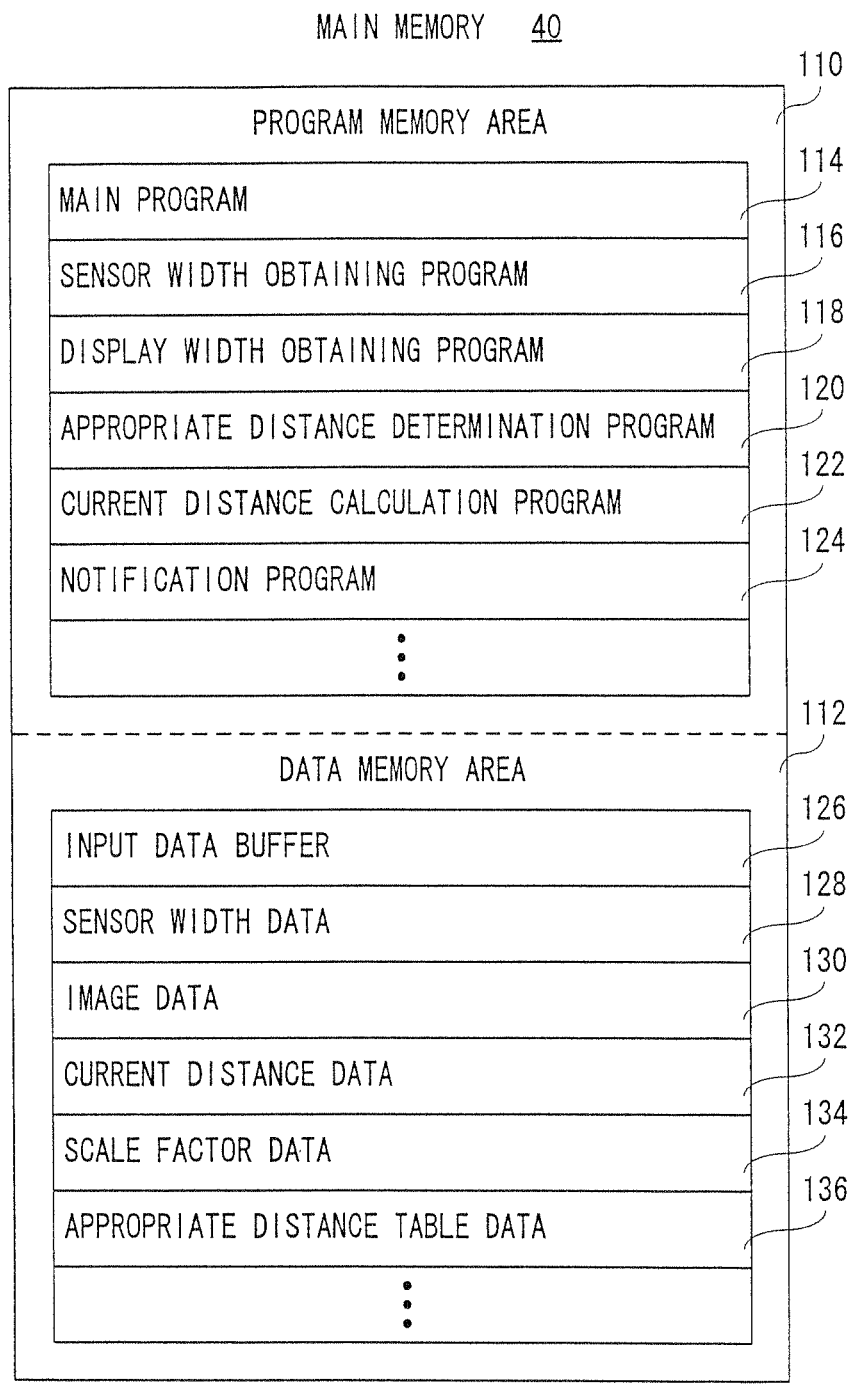
FIG. 12 is an illustrative view showing one example of a memory map of a main memory.

FIG. 12 shows one example of a memory map of the main memory 40. The main memory 40 includes a program memory area 110 and a data memory area 112. A part of a program and data is read from the optical disk 18 entirely or partially and sequentially as needed, and stored in the main memory 40. Note that FIG. 12 shows only a part of the memory map, and other programs and data required for processing are also stored. For example, sound data for outputting voice sound, sound effect, and music is read from the optical disk 18 and stored in the data memory area 112. Further, data of various predetermined numerical values such as the maximum display width M of the image displayed on the display surface, the viewing angle a of the imaging element 98, and the width Ri of the imaged image are also read from the optical disk 18 and stored in the data memory area 112.

In a memory area 114 of the program memory area 110, a main program for executing a main routine for the adjustment process of this embodiment is stored.

In a memory area 116, a sensor width obtaining program is stored. By this program, the interval between the marker 340m and the marker 340n, i.e., the sensor width S is obtained. In this embodiment, the sensor width S is previously determined, and therefore, the previously stored sensor width data is read from a predetermined area in the data memory area 112. Note that, in another embodiment, when the sensor width is made variable, the sensor width inputted by the player can be obtained based on the input data with this program.

In a memory area 118, a display width obtaining program is stored. By this program, as shown in FIG. 8 in the above, the processes for obtaining the sensor-corresponding width W based on the input data and for calculating the display width D are performed. Note that, in another embodiment, when the display width is inputted by the player, the display width inputted by the player is obtained based on the input data.

In a memory area 120, an appropriate distance determination program is stored. By this program, the appropriate distance based on the display width and the sensor width is determined. In this embodiment, as described later, because appropriate distance table data is previously stored, the appropriate distance corresponding to the display width is determined by referring to this table. Note that, in another embodiment, the appropriate distance may be calculated, based on the obtained display width D, the obtained sensor width S, and the previously stored viewing angle a of the imaging element 98, according to the equation 2 and the equation 3 as described above when these equations are equal, without preparing the appropriate distance table data.

In memory area 122, a current distance calculation program is stored. By this program, the current distance between the controller 22 and the markers 340m and 340n is calculated. The current distance, as described referring to FIG. 10 in the above, is calculated using the distance Si between the marker images 340m' and 340n' on the imaged image by the imaging element 98. Specifically, the current distance Lc is calculated according to the above equation 5 based on the actual imaging range width R by the imaging element 98 and the viewing angle a of the imaging element 98. The imaging range width R is calculated according to the above equation 4 based on the width Ri of the imaged image, the actual distance between the markers 340m and 340n (the sensor width S), and the distance Si between the marker images.

In a memory area 124, a notification program is stored. By this program, the notification according to the relation between the current distance and the appropriate distance is performed. In this embodiment, as shown in FIG. 11, the CPU 36 produces an image including the reference image 202 of a predetermined size and the adjustment image 204 varying in size according to the difference between the current distance and the appropriate distance using the GPU 42, and displays the image on the monitor 34 via such as the video I/F 58. Further, when performing the notification with sound, the CPU 36 uses the DSP 52 to produce audio data for outputting the sound such as the voice sound and the sound effect according to the difference between the current distance and the appropriate distance. When outputting from the speaker 34a of the monitor 34, the CPU 36 outputs the sound based on the audio data from the speaker 34a via the audio I/F 62 and such. Further, when outputting from the speaker 104 of the controller 22, the CPU 36 transmits the sound output instruction data including the audio data to the controller 22 via the Bluetooth communication unit 66 and such. Moreover, when notifying by vibration, the CPU 36 produces the vibration control data for outputting vibration according to the difference between the current distance and the appropriate distance, and transmits the vibration output instruction data including the data to the controller 22. In addition, when the notification is performed by light output of the LED 76, the lighting control data is produced in order to obtain a lighting state according to the difference between the current distance and the appropriate distance, and transmits the lighting instruction data including the data to the controller 22.

A memory area 126 of the data memory area 112 is an input data buffer, and controller data received every predetermined time (one frame) is stored. In a memory area 128, the sensor width data indicating the distance between the two markers 340m and 340n of the sensor bar 34b is stored. In this embodiment, the sensor bar 34b in which the positions of the two markers 340m and 340n are fixed is prepared, the sensor width S is fixed at the predetermined distance. In other words, the sensor width data is previously stored in the optical disk 18, and the sensor width data is read and stored in the memory area 128.

In a memory area 130, image data for producing an image to be displayed on the monitor 34 is stored. For example, image data for displaying the image 200 as shown in FIG. 8 for obtaining the sensor-corresponding width, the reference image 202 and the adjustment image 204 as shown in FIG. 11 (reference size), and various display screens and such is stored.

In a memory area 132, the current distance calculated by the above current distance calculation program is stored. In the memory area 134, scale factor data for enlarging/reducing the adjustment image 204 of the reference size is stored. This scale factor is, as described above, a ratio between the appropriate distance L and the current distance Lc.

In a memory area 136, the appropriate distance table data is stored. As shown in FIG. 13, the appropriate distance is stored in association with the display width in the appropriate distance table data. The size of the display surface of the monitor 34 available on market is determined. Further, in this embodiment, the sensor width S is fixed. Therefore, according to the predetermined equation provided that θ in the above equation 2 and β in the equation 3 are equal, appropriate distance L1, L2, . . . Ln corresponding to display widths D1, D2, . . . Dn for all of the sizes of the monitor 34 are previously calculated and stored in the optical disk 18 as table data. The above appropriate distance determination program in this embodiment refers to the appropriate distance table data and obtains the appropriate distance corresponding to the display width obtained by the display width obtaining program.

Figure 14:
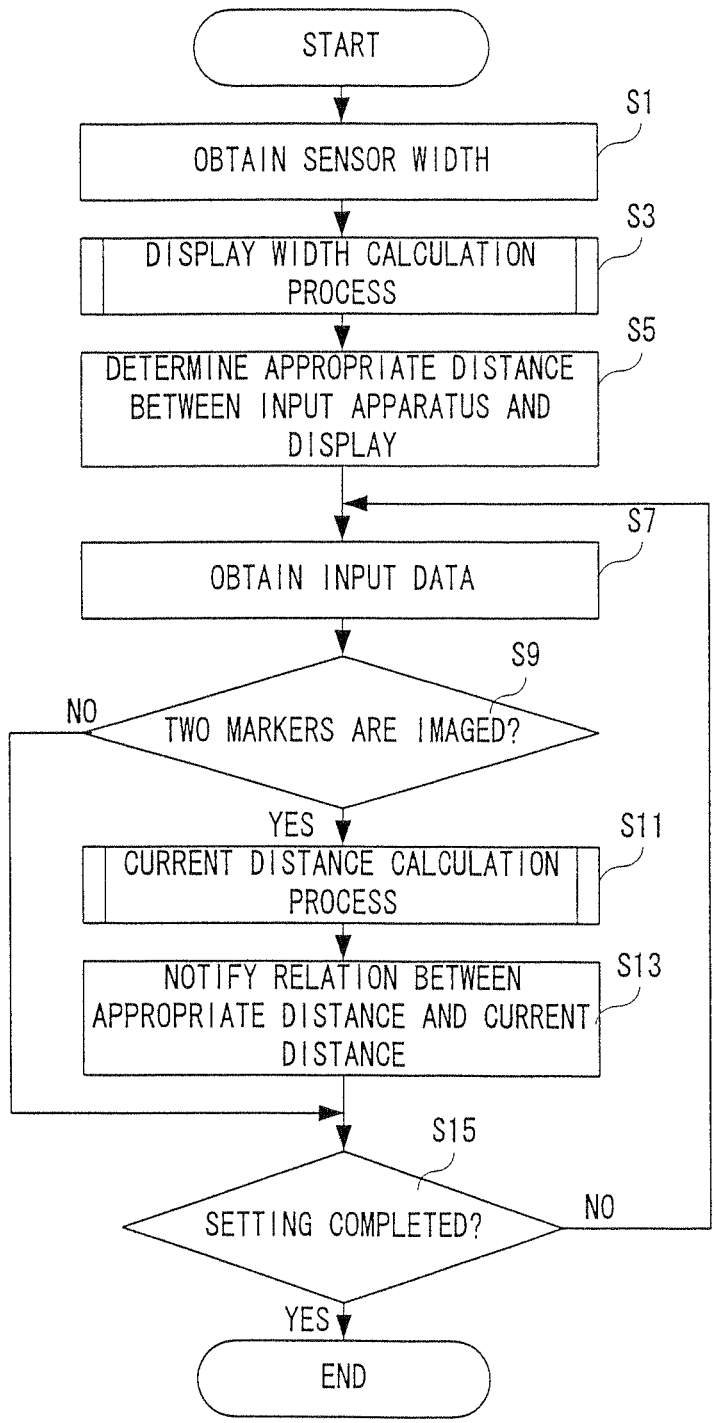
FIG. 14 is a flowchart showing one example of an operation of an adjustment process of a video game apparatus.

FIG. 14 shows an exemplary operation of the adjustment process of the CPU 36. Upon initiation of the adjustment process, the CPU 36 obtains the sensor width S in a step S1, according to the sensor width obtaining program. In this embodiment, since the sensor width S is fixed, the read sensor width data is stored in the memory area 128.

Figure 15:
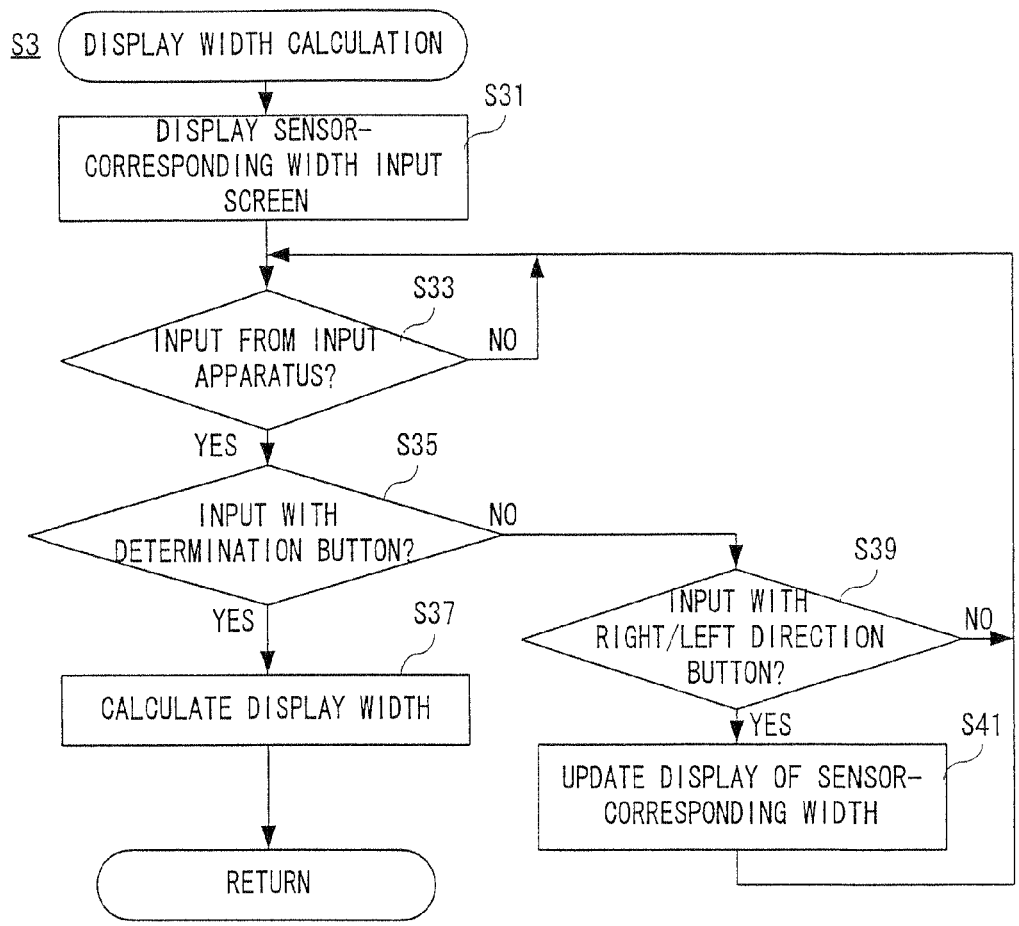
FIG. 15 is a flowchart showing one example of an operation of a display width calculation process shown in FIG. 14.

In a step S3, the CPU 36 executes the display width calculation process according to the display width obtaining program. The detail of the display width calculation process is shown in FIG. 15. In a step S31 in FIG. 15, the CPU 36 uses the GPU 42 to display a sensor-corresponding width input screen as shown in FIG. 8 on the monitor 34.

Next, in a step S33, the CPU 36 determines, based on the input data in the input data buffer 126, whether or not there is an input for determining the sensor-corresponding width from the controller 22 as the input apparatus. Specifically, it is determined whether or not there is the data indicating the fact that the operating portion 72 of the controller 22 is operated in the input data. The confirmation of the input data is continued until it is determined to be "YES" in the step S33.

If "YES" in the step S33, the CPU 36 determines, in a step S35, whether or not the input is of a determination button. Specifically, the CPU 36 determines whether or not the A button 72*d* is pressed based on the input data. If "YES" in the step S35, the CPU 36 calculates, in a step S37, the display width D according to the equation 1. The sensor-corresponding width W can be obtained by detecting the number of pixels of the image 200 in widthwise direction indicating the sensor-corresponding width when the A buttons 72 is pressed.

On the other hand, if "NO" in the step S35, the CPU 36 determines, in a step S39, whether or not the input is from the right/left direction button. Specifically, the CPU 36 determines, based on the input data, whether one of the right direction and the left direction of the cross key 72*a* is pressed. If "YES" in the step S39, the CPU 36 updates, in a step S41, the display of the sensor-corresponding width. Specifically, the CPU 36 increases or decreases the sensor-corresponding width W by a predetermined length according to a direction indicated by the cross key 72*a*, and produces the image 200 indicating the sensor-corresponding width W using the GPU 42, and displays the image 200 on the monitor 34. Upon completion of the step S41, the process returns to the step S33.

Upon completion of the step S37, the display width calculation process ends, and the process returns to a step S5 of FIG. 14.

In the step S5 of FIG. 14, the CPU 36 determines the appropriate distance L between the controller 22 as the input apparatus and the monitor 34 as the display according to the appropriate distance determination program. Specifically, the CPU 36 refers to the appropriate distance table data, and reads the appropriate distance L corresponding to the display width D calculated in the step S37 in a predetermined area in the data memory area 112.

In a step S7, the CPU 36 obtains the input data from the input data buffer 126. Then, in a step S9, the CPU 36 determines, based on the input data, whether or not the two markers 340*m* and 340*n* are imaged. Specifically, it is determined whether or not the marker coordinate data indicating the two markers 340*m* and 340*n* is included the input data.

Figure 16:
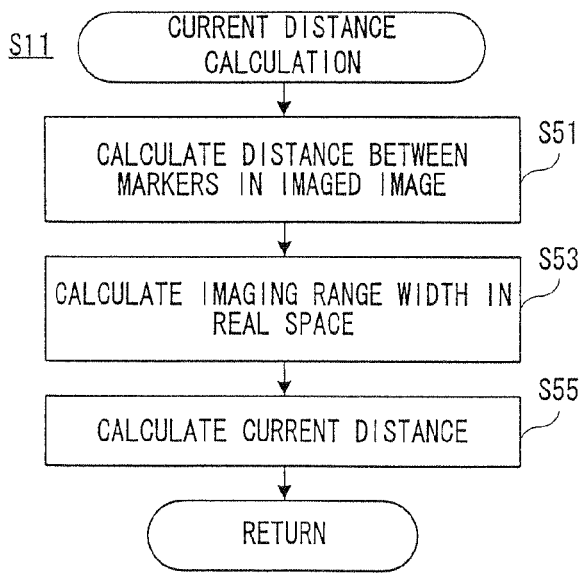
FIG. 16 is a flowchart showing one example of an operation of a current distance calculation process shown in FIG. 14.

If "YES" in the step S9, the CPU 36 executes, in a step S11, the current distance calculation process according to the current distance calculation program. The detail of the current distance calculation process is shown in FIG. 16. In a step S51 in FIG. 16, the CPU 36 calculates the distance Si between the markers in the imaged image. Specifically, as described in the explanation for FIG. 10, based on the marker coordinate data included in the input data, the distance Si between the coordinates of the marker images 340*m*' and 340*n*' is calculated.

Next, in a step S53, the CPU 36 calculates the imaging range width R in the real space. Specifically, the CPU 36 calculates the imaging range width R, according to the equation 4, based on the imaged image width Ri read from the optical disk 18 to a predetermined area of the data memory area 112, the sensor width S stored in the memory area 128, and the calculated distance Si between the markers.

Then, in a step S55, the CPU 36 calculates the current distance Lc from the markers 340*m* and 340*n* to the controller 22. Specifically, the CPU 36 calculates the current distance Lc, according to the equation 5, based on the viewing angle a of the imaging element 98 read from the optical disk 18 to the predetermined area of the data memory area 112 and the calculated imaging range width R. The calculated current distance Lc is stored in the memory area 132. Upon completion of the current distance calculation process, the process returns to a step S13 of FIG. 14.

In the step S13 of FIG. 14, the CPU 36 notifies the relation between the appropriate distance and the current distance according to the notification program. For example, in a case where the notification is performed by the image display, the CPU 36 produces an image including the reference image 202 and the adjustment image 204 as shown in FIG. 11, using the GPU 42, and displays the produced image on the monitor 34. The scale factor for determining the size of the adjustment image 204 is calculated based on the appropriate distance L determined in the step S5 and the current distance Lc calculated in the step S11, and stored in memory area 134. Therefore, the size of the adjustment image 204 is changed based on this scale factor data. In a case where the notification is performed by the sound output, as described above, the CPU 36 produces the audio data using the DSP 52 to output the sound from the speaker 34*a*, or transmits the sound output instruction data to the controller 22 to output the sound from the speaker 104 of the controller 22. Further, in a case where the notification is performed by the vibration output, as described above, the CPU 36 transmits vibration instruction data to the controller 22 and has the vibrator 106 of the controller 22 vibrate. Moreover, in a case where the notification is performed by the light output, as described above, the CPU 36 transmits the lighting instruction data to the controller 22 and has the LED 76 of the controller 22 light. It is desirable that the notification by the sound, vibration, and light is performed for a predetermined time period (predetermined number of frames), such as every few seconds, until it is determined to be "YES" in a following step S15.

On the other hand, if "NO" in the step S9, the process proceeds straight to the step S15. In the step S15, the CPU 36 determines whether or not the setting is completed. Specifically, it is determined, based on the input data, whether or not the A button 72*d* for inputting the setting completion is pressed during the display of the image indicating the relation between the appropriate distance and the current distance as in FIG. 11, or after the notification by the sound, vibration, and light is performed. If "NO" in the step S15, the process returns to the step S7. On the other hand, if "YES" in the step S15, the adjustment process ends.

According to this embodiment, it is possible to notify the appropriate distance between the markers 340*m* and 340*n* (monitor 34) and the controller 22. Therefore, the player is able to operate with the optimum distance from the display screen, where a position or a direction pointed by the controller 22 of the player on the display screen matches a position or a direction recognized on the display screen.

Figure 17:
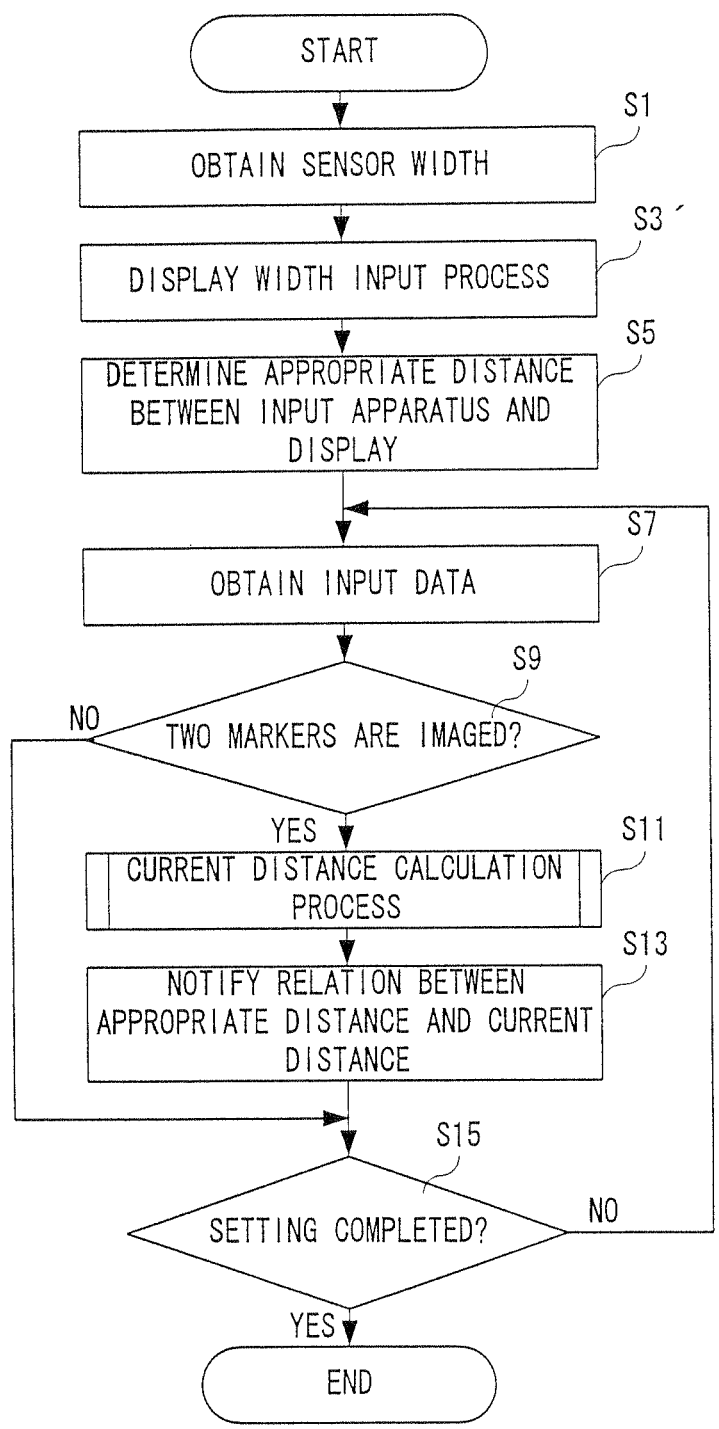
FIG. 17 is a flowchart showing an operation of an adjustment process of another embodiment.

In the above described embodiment, the width of the display surface of the monitor 34, i.e., the display width D is calculated. However, in another embodiment, the display width D may be inputted by the player. In this embodiment, as shown in FIG. 17, the CPU 36 executes the display width input process in a step S3' instead of the step S3. For example, a display screen configured to enable an input of a value of the display width by an operation of the operating portion 72 is displayed so that the display width is obtained based on the input data. Further, it is possible to make both of the calculation of the display width based on the obtaining of the sensor-corresponding width as shown in FIG. 8 and the player input of the width executable.

Figures 18, 19:
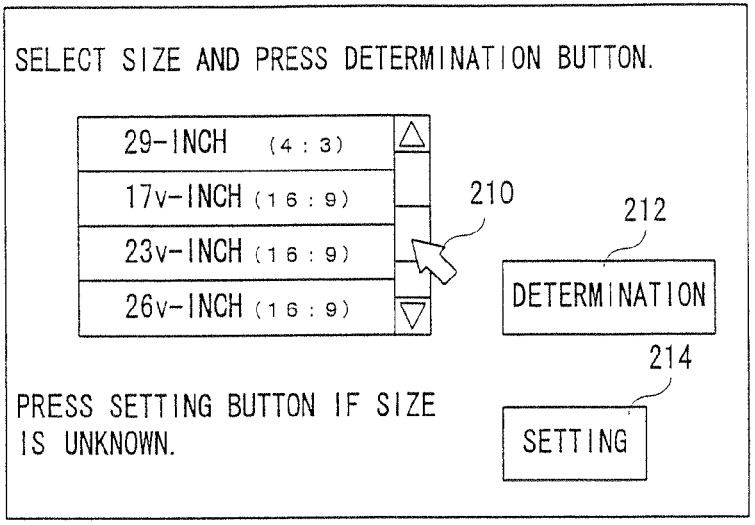
FIG. 18 is an illustrative view showing one example of a display size input screen displayed in another embodiment.
FIG. 19 is an illustrative view showing one example of an appropriate distance table of the embodiment shown in FIG. 18.

Furthermore, in another embodiment, the display width may be obtained by having the player select the display size. In this embodiment, for example, the display size input screen as shown in FIG. 18 is displayed on the monitor 34. Displayed on this input screen is a list of sizes of the display surfaces used for the monitor 34 available in market. The player may select a display size from the list using, for example, a cursor 210 by operating the controller 22, and then, may input the display size by pressing a determination button 212 with the cursor 210. The cursor 210 may be moved by operating the cross key 72*a* of the controller 22, or the cursor 210 may be displayed on a pointed position by the controller 22. Moreover, in this input screen, the display width may be calculated by obtaining the sensor-corresponding width as shown in FIG. 8, and it is possible to obtain the sensor-corresponding width by pressing a setting button 214 on the input screen in FIG. 18.

In the appropriate distance table of this embodiment, as shown in FIG. 19, the display width D1, D2, . . . Dn and the appropriate distance L1, L2, . . . Ln are stored in association with display sizes K1, K2, . . . Kn. Therefore, it is possible to determine the appropriate distance corresponding to the inputted display size by referring to this table.

Figure 20:
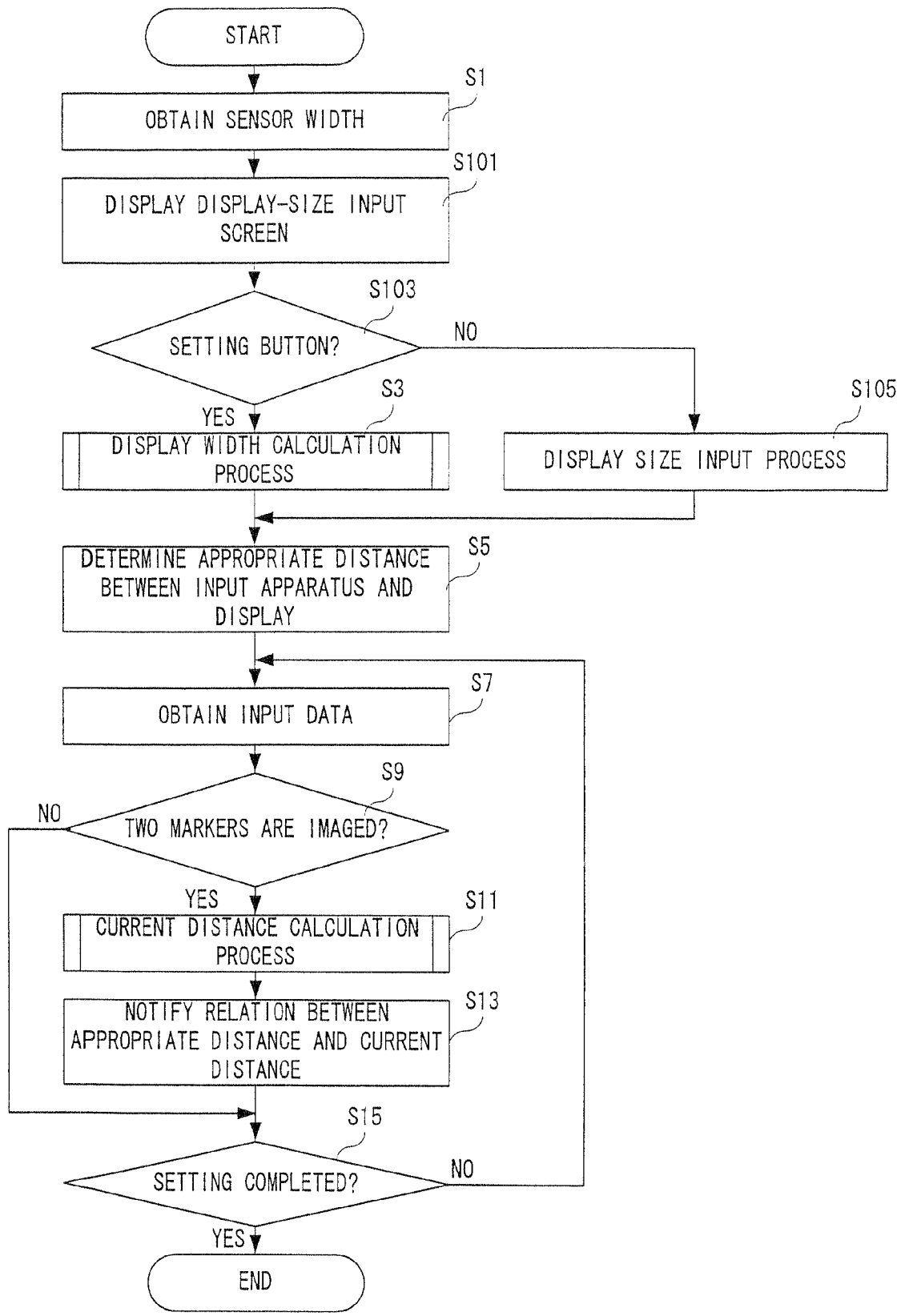
FIG. 20 is a flowchart showing an operation of an adjustment process of the embodiment shown in FIG. 18.

FIG. 20 shows an operation of the adjustment process of this embodiment. The CPU 36 displays, in a step S101 after the step S1, the display size input screen on the monitor 34. By this, the input screen as shown in FIG. 18 is displayed. Next, the CPU 36 determines, in a step S103, whether or not the setting button 214 is selected based on the input data. If "YES" in the step S103, the CPU 36 executes, in the step S3, the display width calculation process as described above. On the other hand, if "NO" in the step S103, the CPU 36 executes, in a step S105, a display size input process. In this step S105, the display size selected from the list is specified based on the input data.

Further, although the interval between the two markers 340*m* and 340*n* is fixed in each of the above embodiments, the marker interval may be variable in a different embodiment. Specifically, the sensor bar 34*b* may be variable in its length, and the player may adjust the length according to the situation of each family. In this embodiment, the distance between the markers 340*m* and 340*n* has to be inputted by the player. Therefore, in the step S1 of each of the above embodiments, for example, the display screen configured to allow the values of the sensor width to be inputted by operating the operating portion 72 is displayed, and the sensor width S is obtained based on the input data. Moreover, in the processing for determining the appropriate distance in the step S5, the appropriate distance L is calculated according to the relation obtained by the equation 2 and the equation 3.

In each of the above embodiments, the two markers are taken as an example of the known imaging objective. However, the present invention is not limited to the above example, and any marker whose actual size may be recognized may be employed. For example, a single marker of a known size may be employed. In this case, because the size of the marker is known, it is possible to calculate the current distance between the marker and the controller 22 according to the above described method based on the size of the marker and the size of the marker image on the imaged image. Furthermore, if the imaging element 98 and the image processing circuit 100 are capable of recognizing a color image, example embodiments of the present invention may be realized by setting a marker of a predetermined color and size as the known imaging objective.

Although example embodiments of the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium having stored thereon a program which is executable by a computer, input data being one of data of an image of an imaging object obtained by an imaging unit and data obtained by performing a predetermined operation on the data of the obtained image, and information processing being performed using the input data to output to a display apparatus, the program upon execution by the computer causing the computer to:
   obtain a width of a display surface of said display apparatus;
   determine an appropriate distance between an input apparatus and said display apparatus according to the obtained width of said display surface;
   calculate a current distance between said imaging unit and said imaging object based on said input data; and
   generate a notification according to relation between said appropriate distance and said current distance.

2. A non-transitory storage medium according to claim 1, wherein the program upon execution by the computer causes the computer to:
   generate said notification by one of outputting image display, outputting sound including at least one of a voice sound and a sound effect, and having said input apparatus vibrate, according to a difference between said current distance and said appropriate distance.

3. A non-transitory storage medium according to claim 1, wherein the program upon execution by the computer causes the computer to:
   generate said notification by displaying, on said display apparatus, a reference image having a predetermined size and an adjustment image varying in size in conjunction with said current distance and becoming the same size as said reference image when said current distance is equal to said appropriate distance.

4. A non-transitory storage medium according to claim 1, wherein
said imaging object is constituted by two markers positioned with a distance therebetween measured in a first scale,
the program upon execution by the computer further causes the computer to obtain said distance between the two markers either inputted by a user or previously stored, and
to obtain the width of the display surface, the program upon execution by the computer causes the computer to:
measure a distance between said two markers in a second scale by varying an interval in the positioning direction between said two markers in an image displayed on said display surface, according to the input by the user; and
calculate the width of said display surface in said first scale based on a ratio between said obtained distance and the measured distance between said markers, as well as based on the width of said display surface in said second scale.

5. A non-transitory storage medium according to claim 4, wherein the program upon execution by the computer causes the computer to:
calculate said current distance using the distance between said two markers on said obtained image.

6. A non-transitory storage medium according to claim 1, wherein
said imaging object is constituted by two markers positioned with a distance therebetween measured in a first scale,
the program upon execution by the computer further causes the computer to obtain said distance between the two markers either inputted by a user or previously stored, and
to obtain the width of the display surface, the program upon execution by the computer causes the computer to:
measure a distance between said two markers in a second scale by varying an interval in the positioning direction between said two markers in an image displayed on said display surface, according to the input by the user; and
calculate the width of said display surface in said first scale based on a ratio between the measured distance between said markers and the width of said display surface in said second scale, as well as based on said obtained distance.

7. A non-transitory storage medium according to claim 6, wherein the program upon execution by the computer causes the computer to:
calculate said current distance using the distance between said two markers on said obtained image.

8. A non-transitory storage medium according to claim 1, wherein
to obtain the width of the display surface, the program upon execution by the computer causes the computer to obtain the width, inputted by the user, of the display surface of said display apparatus.

9. A pointing device for obtaining input data, the input data being one of data of an image of an imaging object obtained by an imaging unit and data obtained by performing a predetermined operation on the data of the obtained image, and information processing being performed using the input data to output to a display apparatus, comprising:
a display surface width obtainer for obtaining a width of a display surface of said display apparatus;
an appropriate distance determiner for determining an appropriate distance between an input apparatus and said display apparatus according to the width of said display surface obtained by said display surface width obtainer;
a current distance calculator for calculating a current distance between said imaging unit and said imaging object based on said input data; and
a notifier for making a notification according to relation between said appropriate distance and said current distance.

10. A method comprising:
obtaining input data from an imaging unit for imaging an imaging object;
performing, by a computer system having one or more computers, information processing using the input data to generate an output to a display apparatus;
obtaining a width of a display surface of said display apparatus;
determining an appropriate distance between a controller and said display apparatus according to the obtained width of said display surface;
calculating a current distance between said imaging unit and said imaging object based on said input data; and
generating a notification according to relation between said appropriate distance and said current distance.

11. A system comprising:
an imaging element configured to obtain an image of an imaging object; and
a computer configured to:
receive input data;
perform information processing using the input data to generate an output to a display apparatus;
obtain a width of a display surface of said display apparatus;
determine an appropriate distance between a controller and said display apparatus according to the obtained width of said display surface;
calculate a current distance between said imaging element and said imaging object based on said input data; and
generate a notification according to a relation between said appropriate distance and said current distance.

* * * * *